(12) United States Patent
Ishida

(10) Patent No.: US 8,145,767 B2
(45) Date of Patent: Mar. 27, 2012

(54) SENSOR DEVICE, SERVER NODE, SENSOR NETWORK SYSTEM, METHOD OF ESTABLISHING COMMUNICATION PATH, CONTROL PROGRAM, AND STORAGE MEDIUM

(75) Inventor: Akihito Ishida, Yamatotakada (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 1148 days.

(21) Appl. No.: 11/939,419

(22) Filed: Nov. 13, 2007

(65) Prior Publication Data
US 2008/0298302 A1   Dec. 4, 2008

(30) Foreign Application Priority Data

Nov. 16, 2006  (JP) .................................. 2006-310612

(51) Int. Cl.
*G06F 15/16*   (2006.01)
(52) U.S. Cl. ........................ 709/227; 709/228; 709/229
(58) Field of Classification Search .................. 709/227, 709/228, 229
See application file for complete search history.

(56) References Cited

U.S. PATENT DOCUMENTS

| | | |
|---|---|---|
| 2004/0254652 A1 | 12/2004 | Ota et al. |
| 2005/0064871 A1 | 3/2005 | Kawasaki et al. |
| 2006/0023672 A1 | 2/2006 | Ahlers et al. |

FOREIGN PATENT DOCUMENTS

| | | |
|---|---|---|
| JP | 2003-115092 | 4/2003 |
| JP | 2005-094530 | 4/2005 |
| JP | 2005-157744 | 6/2005 |
| JP | 2006-033654 | 2/2006 |
| JP | 2006-74748 | 3/2006 |
| JP | 2006-101414 | 4/2006 |
| JP | 2006-186561 | 7/2006 |

*Primary Examiner* — Adnan Mirza
(74) *Attorney, Agent, or Firm* — Morrison & Foerster LLP

(57) ABSTRACT

For the purpose of allowing a sensor device (10) to carry out wireless communication with a server node (11), the sensor device (10) makes an inquiry about the server node (11) connectable to the sensor device (10) (S12). The server node (11) responds to the sensor device (10) (S13). The sensor device (10) transmits a result of the inquiry as a candidate list (S15). The server node (11) transfers the candidate list to a top node (S16). The top node receives key information and selection information selected from the candidate list, and transmits the key information and the selection information to the server node (11) selected (S19). The server node (11) transfers to the sensor device (10) the selection information, the key information, and a building ID and a room ID of the server node (11). The sensor device (10) determines whether the key information received agrees with sensor device key information (S20). When the key information agrees with the sensor device key information, the sensor device (10) notifies, to the server node (11), the agreement and an individual ID of the sensor device (10), and stores the building ID and the room ID (S21). This makes it possible to provide a sensor network system in which a communication path is safely and reliably established even when a different network exists in a communication area and a method of establishing the communication path.

8 Claims, 16 Drawing Sheets

FIG. 4 (a)

| | 120 |
|---|---|
| BUILDING ID | 001 |
| INDIVIDUAL ID | 100 |

| BUILDING ID | 001 |
|---|---|
| ROOM ID | 010 |
| INDIVIDUAL ID | 101 |

110B

| BUILDING ID | 001 |
|---|---|
| ROOM ID | 011 |
| INDIVIDUAL ID | 102 |

110C

| BUILDING ID | 001 |
|---|---|
| ROOM ID | 012 |
| INDIVIDUAL ID | 103 |

110D

| BUILDING ID | 001 |
|---|---|
| ROOM ID | 013 |
| INDIVIDUAL ID | 104 |

| BUILDING ID | 001 |
|---|---|
| ROOM ID | 010 |
| INDIVIDUAL ID | 110 |

100B

| BUILDING ID | 001 |
|---|---|
| ROOM ID | 010 |
| INDIVIDUAL ID | 111 |

..........

100L

| BUILDING ID | 001 |
|---|---|
| ROOM ID | 013 |
| INDIVIDUAL ID | 121 |

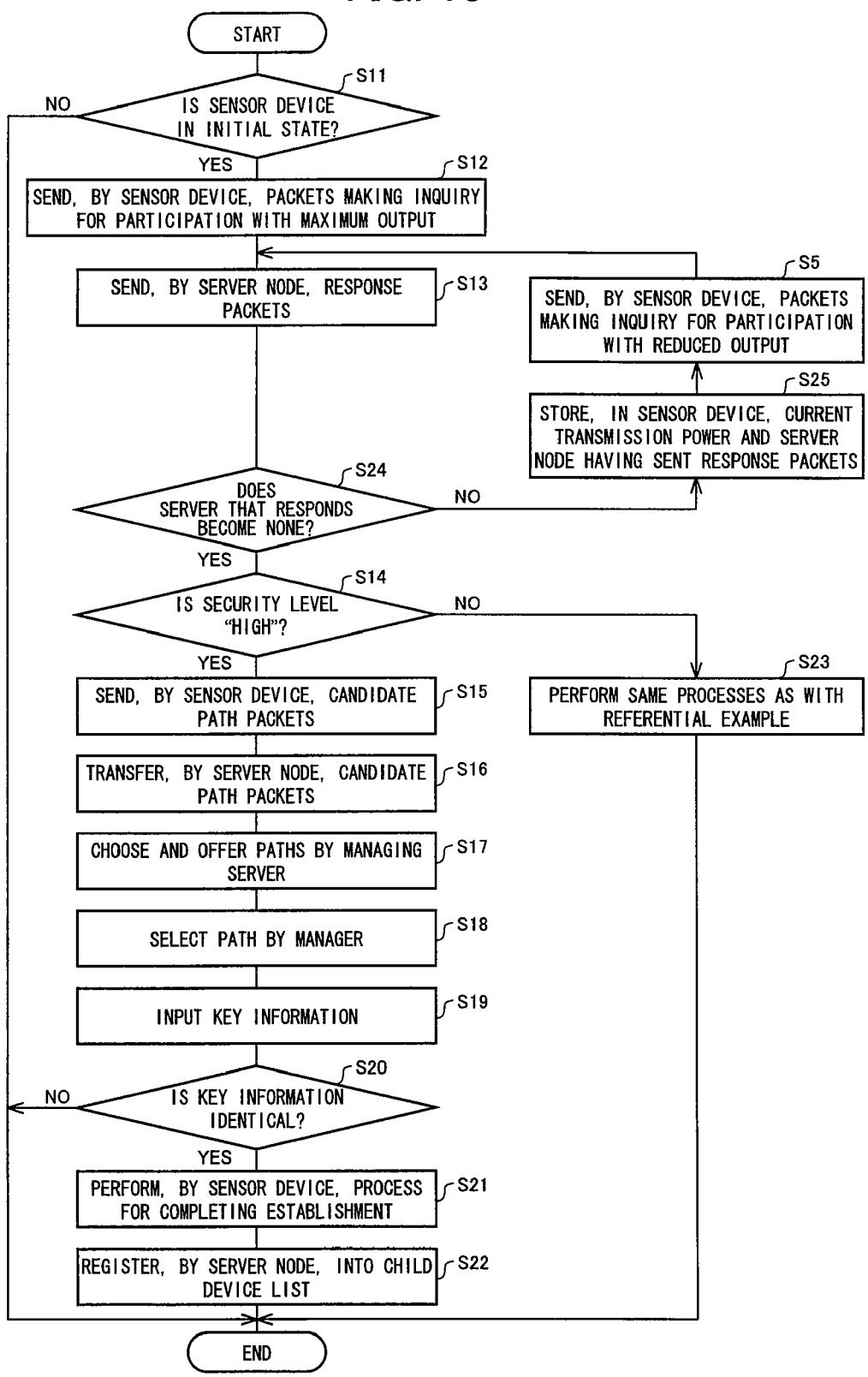

SENSOR DEVICE, SERVER NODE, SENSOR NETWORK SYSTEM, METHOD OF ESTABLISHING COMMUNICATION PATH, CONTROL PROGRAM, AND STORAGE MEDIUM

This Nonprovisional application claims priority under U.S.C. §119(a) on Patent Application No. 310612/2006 filed in Japan on Nov. 16, 2006, the entire contents of which are hereby incorporated by reference.

FIELD OF THE INVENTION

The present invention relates to a sensor network system including a sensor device having a wireless communication function, and a method of establishing a communication path in the sensor network system. More specifically, the present invention relates to a sensor network system and a method of establishing a communication path which are for safely and reliably establishing a communication path used in transmitting/receiving detection data detected by the sensor device.

BACKGROUND OF THE INVENTION

A sensor network system includes many sensor devices (also called sensor modules) each having a wireless communication function. The sensor network system is used for various purposes in every field, for example, crime-prevention, nursing care, energy conservation, wide area measurement, or tracing.

For example, in the field of nursing care, with sensor devices, a ventricular rate, a body temperature, posturing, moves of limbs, a state of emergency, and the like of a cared person can be monitored. Moreover, for example, in building environment, with sensor devices, earthquake data, moves of a structural support section, fire disaster, flood and the like can be checked.

Furthermore, for example, in home applications, the sensor network system is considered to be used for various purposes such as home security, monitor/control of appliances, watch/nursing care, remote management, and the like.

The sensor devices are set in a wide area. Moreover, a case in which a large number of the sensor devices are additionally set is easily expected because of good installation capability of the sensor devices. When the sensor network system is used in home applications, the sensor devices are additionally set and many sensor devices are set inside/outside of a building, because of the good installation capability of the sensor devices.

Accordingly, in order to reduce trouble of a manager, it is preferable that communication paths of the many sensor devices set are autonomously established. The autonomy is an important factor in the sensor network system.

Regarding a conventional method of establishing a communication path, Japanese Unexamined Patent Publication No. 94530/2005 (Tokukai 2005-94530) (published on Apr. 7, 2005) discloses a method of autonomously establishing a network of wireless devices with one base station at the center.

Moreover, Japanese Unexamined Patent Publication No. 157744/2005 (Tokukai 2005-157744) (published on Jun. 16, 2005) discloses a method of autonomously establishing a wireless network by detecting other devices such as facility control means, a center server, or a mobile terminal device, each existing in a predetermined communication distance set in advance.

SUMMARY OF THE INVENTION

However, in a case where arrangements of the conventional techniques as mentioned above are used, the following problems occur.

A method of establishing a communication path in Japanese Unexamined Patent Publication No. 94530/2005 assumes a case in which a single network is established. Accordingly, a case in which a plurality of different networks exist in a communicable area of a sensor device is not considered. In other words, in a case where the same system is used in a neighboring house in the communicable area of the sensor device assigned to a house, the network for home applications cannot be established in a manner such that the house is distinguished from the neighboring house. The same applies to rooms next to each other in the house.

Similarly, in a system of Japanese Unexamined Patent Publication No. 157744/2005, a single network having a center server at the top is assumed. Accordingly, it is not considered that a mobile terminal device detects a network of the same system in a neighboring building. Therefore, in an environment where a plurality of different networks exist in a communicable area of the mobile terminal device, a proper network cannot be established.

The present invention is attained in view of the problems of the conventional techniques mentioned above. The purpose of the present invention is to provide a sensor network system in which a communication path to be established can be specified and established safely and reliably even in a case where a plurality of different sensor networks exist in a communicable area of a device, and a method of establishing a communication path used in the sensor network system.

In order to solve the problem mentioned above, a sensor device of the present invention being managed based on a building ID specifying a building, a room ID specifying a room in the building, and an individual ID specifying each device and carrying out (a) wireless communication with a server node that is a higher-level server node by using the building ID and the room ID stored in the sensor device and (b) communication with a managing server that is a top-level node managing the server node via the server node, the sensor device includes: control means for controlling (a) establishment of a communication path to the server node and (b) communication with the server node, the control means, at the establishment of the communication path to the server node, performing: (I) detection of the server node that is connectable; (II) transmission of information on the communication path including the server node detected as one of candidate communication paths to a managing server that is in a higher level of the server node; (III) reception of information from the server node in the communication path selected, the information including: key information, inputted into the managing server, for determination of the communication path; the communication path selected from the candidate communication paths at the managing server; the building ID of the server node in the communication path selected; and the room ID of the server node in the communication path selected; (IV) notification of (a) the individual ID of the sensor device and (b) agreement between the key information and sensor device key information to the managing server; and (V) storage of the building ID and the room ID of the server node received as the building ID and the room ID of the sensor device, the (IV) notification and the (V) storage performed only in a case where the key information agrees with the sensor device key information, the control means thus completing the establishment of the communication path.

In order to solve the problem mentioned above, the server node of the present invention being managed based on a building ID specifying a building, a room ID specifying a room in the building, and an individual ID specifying each device, and carrying out (a) wireless communication with a managing server that is a higher-level node of the server node by using the building ID and the room ID stored in the server node and (b) wireless communication with a sensor device that is a lower-level node by using the individual ID stored in the server node, the server node includes: control means for controlling (a) establishment of a communication path to the managing server and the sensor device and (b) communication with the managing server and the sensor device, the control means, at the establishment of the communication path to the sensor device, performing: (i) response to an inquiry from the sensor device for detection of the server node that is connectable; (ii) transfer of a candidate list of the communication path to the managing server, the candidate list including information, received from the sensor device, on the communication path; (iii) reception of information from the managing server, the information including the communication path selected and key information inputted in the managing server; (iv) transfer of the information to the sensor device, the information including the building ID and the room ID of the server node, as well as the communication path selected and the key information respectively received from the managing server; and (v) storage of the individual ID of the sensor device received from the sensor device as an individual ID of a sensor device that the server node manages, the (iii) reception, the (iv) transfer, and the (v) storage being performed in a case where the communication path selected from the candidate list at the managing server includes the server node, the control means thus completing the establishment of the communication path.

In order to solve the problem mentioned above, the sensor network system of the present invention includes the sensor device and the server node.

In order to solve the problem mentioned above, the method of establishing a communication path of the present invention through which a sensor device and a server node that is a higher-level node of the sensor device carry out wireless communication by using a building ID and a room ID stored in the sensor device or an individual ID stored in the server node, the sensor device and the server node being managed based on the building ID, the room ID, and the individual ID, the building ID specifying a building, the room ID specifying a room in the building, the individual ID specifying each device, the method comprising the steps of: (i) making an inquiry, by the sensor device, for detection of the server node that is connectable; (ii) making a response, by the server node, to the inquiry; (iii) transmitting, by the sensor device, a result of the inquiry as a candidate list of the communication path; (iv) transferring, by the server node, the candidate list that the server node receives to a managing server that is a higher-level node of the server node; (v) receiving, by the managing server, selection information indicative of the communication path selected from the candidate list and key information and transmitting the selection information and the key information into the communication path selected; (vi) transferring, by the server node, the selection information and the key information that are received by the server node together with the building ID and the room ID of the server node; (vi) determining, by the sensor device, whether or not the key information agrees with sensor device key information; (vii) notifying, by the sensor device, to the server node agreement of the key information and the sensor device key information together with the individual ID of the sensor device; (viii) storing by the server node the individual ID received as an individual ID of a sensor device that the server node manages; and (ix) storing by the sensor device the building ID and the room ID of the server node as the building ID and the room ID of the sensor device, the building ID and the room ID of the server node being received by the sensor device, the method including the steps (vii), (viii), and (ix) only in a case where the key information is identical with the sensor device key information.

In this arrangement, the sensor device is a device that measures an object to be measured which object exists around the sensor device and transmits a measurement value to another device by wireless communication. For example, temperature, pulse of a human body, and existence of a person are measured.

A sensor device newly added to the sensor network system does not determine a server node by itself, when selecting a server node that becomes a higher-level node of the sensor device and establishing a communication path. However, the sensor device offers options of the server node to a manager via a managing server that is a top node. After the manager selects a desired communication path, via the communication path selected, namely, through the managing server to which the manager made an input to the sensor device and the server node selected, it is notified that the communication path is selected. Moreover, the manager is authorized by determining whether or not key information inputted at the managing server agrees with key information set in the sensor device. Ultimately, the communication path selected by thus authorized manager is established as a communication path of the sensor device.

Namely, when the security level of the sensor device is set to "high", the sensor device determines that a communication through a particular communication path is necessary. In such a case, although the sensor device first detects communication paths that can be autonomously established so as to keep convenience and chooses communication paths that belong to the same building as the sensor device, the sensor device does not complete the establishment of the communication path autonomously. In this case, the sensor device transmits, to the server node in the communicable area, information on the communication paths chosen as options for the communication path to be established. The server node further transfers the information to the managing server that is in a higher level of the server node. The managing server offers the options for the communication path to the manager. Then, the manager selects a desired communication path from the options for the communication path. On selecting the desired communication path and completing the establishment of the communication path, the manager inputs, for authorization of the manager, key information having been registered in the sensor device in advance. In a case where this key information is not correctly inputted, the authorization of the manager fails. Consequently, in such a case, the establishment of the communication path is not completed in accordance with the communication path selected by the manager.

The options of the communication path are also provided on a managing server in a neighboring house in the communicable area of the sensor device via a server node in the neighboring house. However, the manager of the neighboring house cannot know the key information. Therefore, a wrong communication path is never established.

<Building ID, Room ID, and Individual ID>

In the wireless sensor network, it is advantageous in reducing communication cost, i.e., reducing a transmission power, to transmit information detected to the nearest device with which communication can be performed with a lower power.

However, in home security use, in a case where there is a similar sensor network in a neighboring house, interference with the network in the neighboring house becomes a problem.

In order to prevent this problem, it is necessary to specify a communication path. This requires management by a building ID for distinction from the neighboring house. Moreover, in home security use, it is important to reduce delay in communication due to interference or the like as much as possible. Accordingly, the indoor network needs to be divided by setting a room ID so as to be designed to have minimum delay.

Moreover, in the sensor network system of the present invention, each of the sensor devices, the server nodes, and the managing server has an individual ID that specifies each of these devices.

It is possible to specify a communication path by linking these individual IDs. However, it is preferable to use the building ID to identify the house and the neighboring house and to use the room ID to distinguish an area such as a room in the same building, so that management load of the manager is reduced.

The individual ID is also used by a higher-level node for managing a lower-level node. Namely, the server node that is a higher-level node of the sensor device includes a child device list for grasping sensor devices that the server node manages. The child device list stores sensor device names and individual IDs of the sensor devices that the server node manages in a manner such that the sensor device names respectively correspond to the individual IDs. Similarly, the managing server includes a child device list. This child device list stores server node names and individual IDs of the server nodes that the managing server manages in a manner such that the server node names correspond to the individual IDs respectively.

On the contrary, the lower-level node does not grasp the individual ID of the higher-level node thereof. When the lower-level node communicates, the lower-level node never carries out transmission by directly specifying the individual ID of the higher-level node. Instead, the lower-level node uses the building ID and the room ID notified by the higher-level node at the establishment of the communication path and specifies indirectly a server node in a room having the room ID and a managing server in a building having the building ID. With this method of indirectly specifying a higher-level node, the server node having the room ID and the managing server having the building ID can be specified uniquely. Therefore, no problem occurs by the method.

The building ID has a sufficient number of digits for identifying all existing buildings in a region or all regions. The room ID has a sufficient number of digits for distinguishing and specifying each divided area inside or around a building. The individual ID also has a sufficient number of digits for distinguishing and specifying each of the sensor devices, the server nodes, and the managing server.

It is preferable that the building ID, the room ID, and the individual ID are stored in an involatile memory in each device.

A building ID is shared by the sensor devices, the server nodes, and the managing server in or around one building. This makes it possible to easily identify the sensor devices, the server nodes, and the managing server that belong to the building from those of a neighboring house. Accordingly, even if sensor devices, server nodes, and a managing server of the neighboring house exist in a communicable area, it is possible to appropriately specify a communication path. Therefore, interface of information to be transmitted does not occur, and an appropriate communication can be performed.

Moreover, a room ID is shared by sensor devices and server nodes in one divided area in one building or around the building. This makes it possible to easily identify the sensor devices and the server nodes in the one divided area from those in a different area. Accordingly, even if a sensor device, having the same function, which sensor device belongs to another area exists in a communicable area, it is possible to appropriately specify a communication path. Therefore, interface of information to be transmitted does not occur, and an appropriate communication can be performed.

Due to widespread use of sensor networks are, many sensor devices, server nodes and managing servers are set and it becomes general to have an environment in which different networks exist together in a communicable area. Even in such an environment, with the use of the building ID, the room ID, and the individual ID, it is possible to provide a sensor network system, such as a home security system, capable of transmitting information detected through an appropriate communication path, According to the arrangement, in the sensor network, even when a communicable area of a sensor device or a server node newly or additionally set includes another sensor network such as a sensor network of an adjacent house, the sensor device or the server node to be set is prevented from being mistakenly connected to a network different from a network to which the sensor device or the server node should be connected. Accordingly, the arrangement makes it possible to establish a communication path safely and reliably.

Consequently, it becomes possible to provide a method of establishing safely and reliably a data transfer path in a wireless network such as a home security system.

For a fuller understanding of the nature and advantages of the invention, reference should be made to the ensuing detailed description taken in conjunction with the accompanying drawings.

BRIEF DESCRIPTION OF THE DRAWINGS

FIG. 3(a) is a block chart of a sensor device. FIG. 3(b) is a block chart of a server node. FIG. 3(c) is a block chart of a managing server.

FIG. 4(a), 4(b) and 4(c) are tables of internal memories in which building IDs, room IDs, and individual IDs are stored, according to a reference example of the present invention. FIG. 4(a) is a diagram illustrating a state in which the IDs are stored in a table of the managing sever. FIG. 4(b) is a diagram illustrating a state in which the IDs are stored in tables of the server node. FIG. 4(c) is a diagram illustrating a state in which the IDs are stored in tables of the sensor device.

FIG. 12(a) is a diagram illustrating a state in which the IDs are stored in tables of the server node. FIG. 12(b) is a diagram illustrating a state in which the IDs are stored in tables of the sensor device.

FIG. 16 is a flow chart illustrating a procedure for establishing a communication path, according to the second embodiment of the present invention.

DESCRIPTION OF THE EMBODIMENTS

Embodiments and a reference example of the present invention are explained below.

Reference Example

<Arrangement of Sensor Network System>

Figure 2:
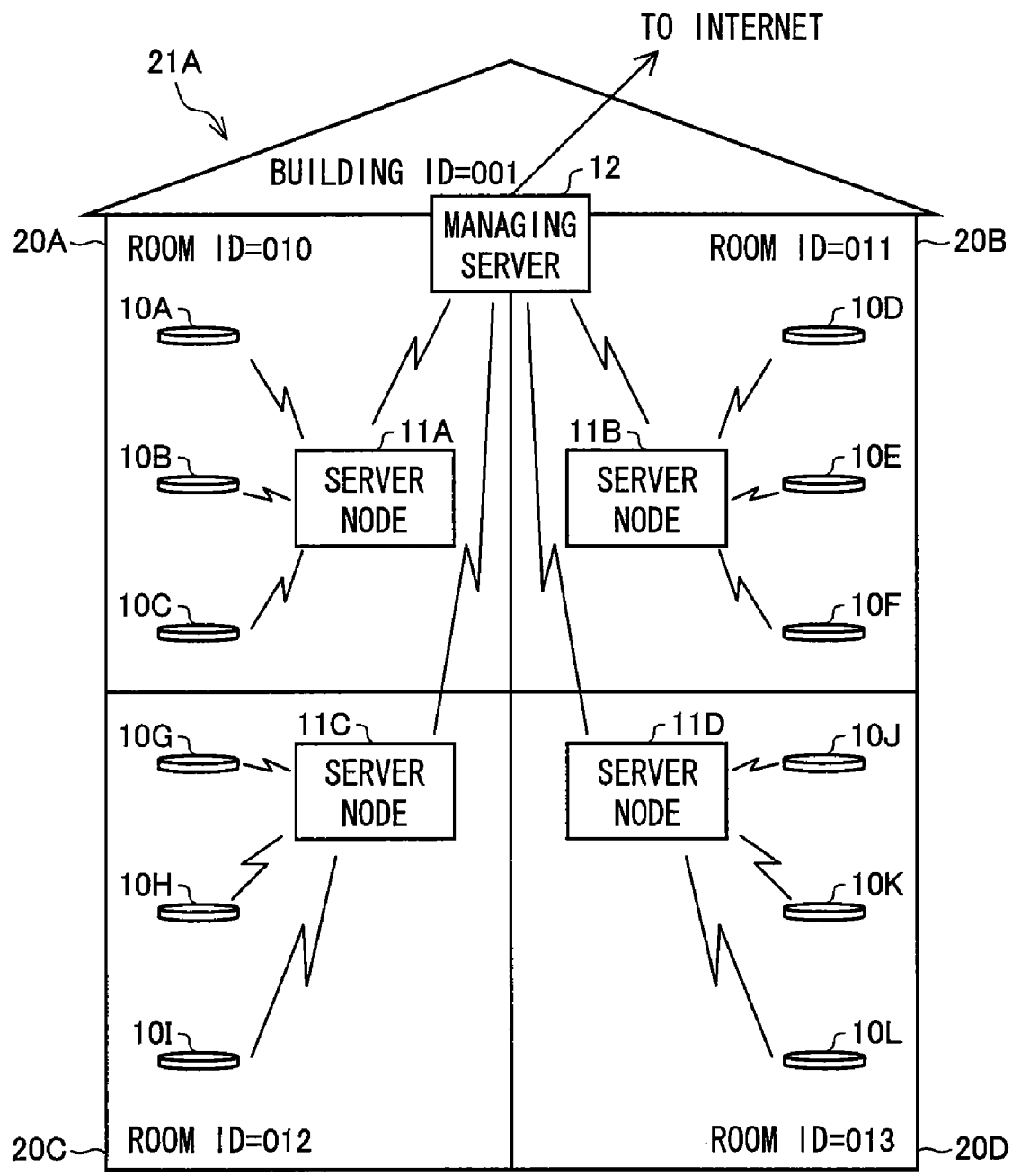
FIG. 2 is a diagram illustrating an arrangement of a sensor network system, according to a reference example of the present invention

FIG. 2 illustrates an arrangement of a sensor network system of the present reference example. The sensor network system includes sensor devices 10A through 10L each having the same or different functions, server nodes 11A through 11D, and a managing server 12A.

The sensor network system exists inside or around the same building 21A.

The sensor devices 10A through 10 C and the server node 11A are in the same room and form a local network.

Similarly, the sensor devices 10D through 10F and the server node 11B are in the same room and form a local network. Moreover, the sensor devices 10G through 10I and the server node 11C are in the same room and form a local network. Furthermore, the sensor devices 10J through 10L and the server node 11D are in the same room and form a local network.

The managing server 12A is in the building 21A and forms a local network with the server nodes 11A through 11D. The managing server 12A is also connected to an external internet for the purpose of using information of the sensor devices or information made from the information from the sensor devices on the internet.

Accordingly, the sensor network is composed of (i) four local networks including the sensor devices 10A through 10L and the server nodes 11A through 11D and (ii) one local network including the server nodes 11A through 11D and the managing server 12A.

The server nodes 11A through 11D perform routing between the local networks and execute an application program. Moreover, the managing server 12A performs routing between the local networks and routing between the local network and the internet, and executes an application program.

<Division of Local Network>

A local network is divided into divisional local networks. This makes it possible to change a communication frequency in each of the divisional local networks. Moreover, by changing the communication frequency in each of the divisional local networks, interference of communication between the divisional local networks can be prevented.

Furthermore, even in a case where the same communication frequency is used, it is possible to prevent interference by reducing a transmission power. Accordingly, the division of a local network makes it possible to carry out more efficient and power saving communication.

<Arrangement of Sensor Devices>

Figure 3:
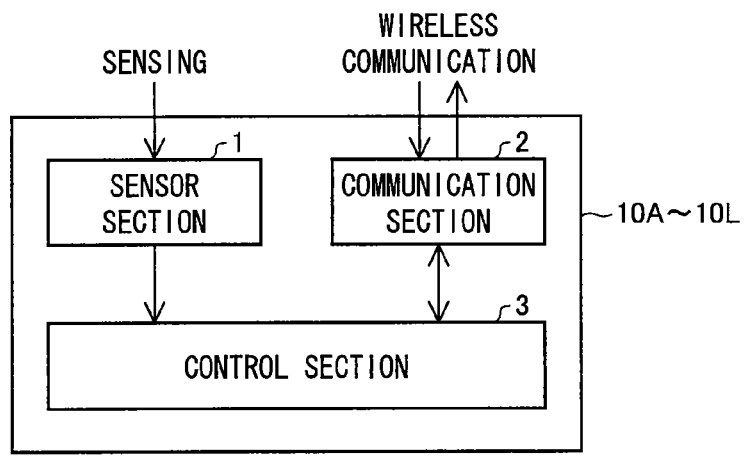
FIGS. 3(a), 3(b), and 3(c) are block charts each illustrating an arrangement of a device.
Figure 3:
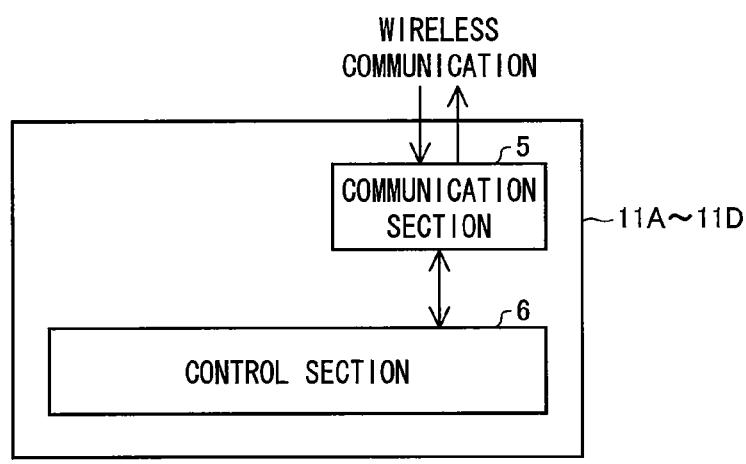
Figure 3:
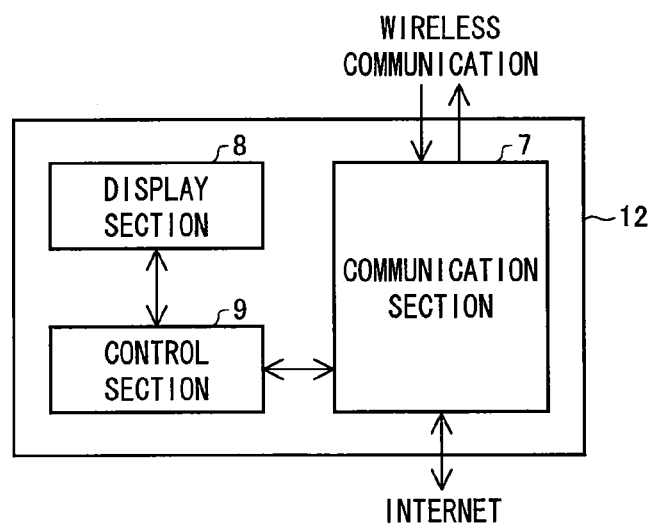

FIG. 3(a) is a block diagram of sensor devices 10A through 10L. Each of the sensor devices 10A through 10L includes a sensor section 1 that detects an object to be measured, a communication section 2 that performs wireless communication with a server node, and a control section 3 (control means) that controls the detection and the communication. The control section 3 includes an internal memory (not shown). The control section 3 includes an internal memory (not shown).

<Arrangement of Server Nodes>

FIG. 3(b) is a block diagram of server nodes 11A through 11D. Each of the server nodes 11A through 11D includes a communication section 5 that performs wireless communication with the sensor devices and a managing server and a control section 6 (control means) that controls the communication. The controls section 6 includes an internal memory (not shown).

<Arrangement of Managing Server>

FIG. 3(c) is a block diagram of a managing server 12A. The managing server 12A includes a communication section 7 that performs wireless communication with the server nodes and communication with the internet, a display section 8 that displays management information to a manager, and a control section 9 that controls the communication and the display. The control section 9 includes an internal memory (not shown).

<Building ID, Room ID, and Individual ID>

As illustrated in FIG. 2, the building 21A is provided with a building ID (in the example shown in FIG. 2, the building 21A is given an ID=001) that has a sufficient number of digits for specifying each building in a region or all regions.

This building ID is stored in each internal memory of the sensor devices, the server nodes, and the managing server.

Moreover, an inside of the building 21A is partitioned into four rooms 20A through 20D. Each room is provided with a room ID. This room ID is assigned to the server node and the sensor devices in the room.

For example, a room ID=010 is assigned to the sensor devices 10A through 10C and the server node 11A in the room 20A.

For example, a room ID=011 is assigned to the sensor devices 10D through 10F and the server node 11B. A room ID=012 is assigned to the sensor devices 10G through 10I and the server node 11C. Moreover, a room ID=013 is assigned to the sensor devices 10J through 10L and the server node 11D.

An individual ID is assigned to each of the sensor devices, the server nodes, and the managing server that are set inside or around the building, so that the devices can be individually specified.

FIG. 4(a) illustrates an arrangement of a table 120 of an internal memory in a control section 9 of a managing server 12A. In the table 120, a building ID and an individual ID are stored.

FIG. 4(b) illustrates arrangements of tables 110A through 110D of internal memories in the control sections 6 each of which is included in each of the server nodes 11A through 11D. In each of the tables 110A through 110D, a building ID, a room ID, and an individual ID are stored.

FIG. 4(c) illustrates arrangements of tables 100A through 110L of internal memories in the control sections 3 each of which is included in each of the sensor devices 10A through 10L. In each of the tables 100A through 100L, a building ID, a room ID, and an individual ID are stored.

<Application Rule>

Each of the server nodes 11A through 11D has an application program, an application rule, and a child device list in addition to the tables 110A, 110B, 110C, or 110D in the internal memory.

The managing server 12A has an application program and an application rule in addition to the table 120 in the internal memory.

The application program is software executed by each of the control sections 6 of the server nodes and the control section 9 of the managing server 12A. The application program controls an address to which data packets that each of the server nodes has received are transferred.

The application rule is a rule that the application program follows at the time of data packet transfer. In the application program, a sender address of data packets is related to a forwarding address of the data packets.

For example, the application rule is such that "data packets received from the sensor device 10C is transferred to the sensor device 10A", "data packets received from the sensor device 10J is transferred to the managing server 12A", or the like.

The application rule may be preset with respect to each of the server nodes 11A through 11D before the product is shipped or set by a manager according to need with a method selected from various methods.

<Child Device List>

As mentioned above, the child device list is established in each internal memory of the server nodes 11A through 11D.

The child device list is a list that relates a name of a sensor device to an individual ID of the sensor device. The child device list is used by each of the server nodes so that each of the server nodes can grasp the sensor devices under the management of the server node.

Each of the server nodes 11A through 11D registers a name of a sensor device and its individual ID in the child device list at the time of completing establishment of a communication path with the sensor device.

<Example of Data Transfer (I)>

Figure 5:
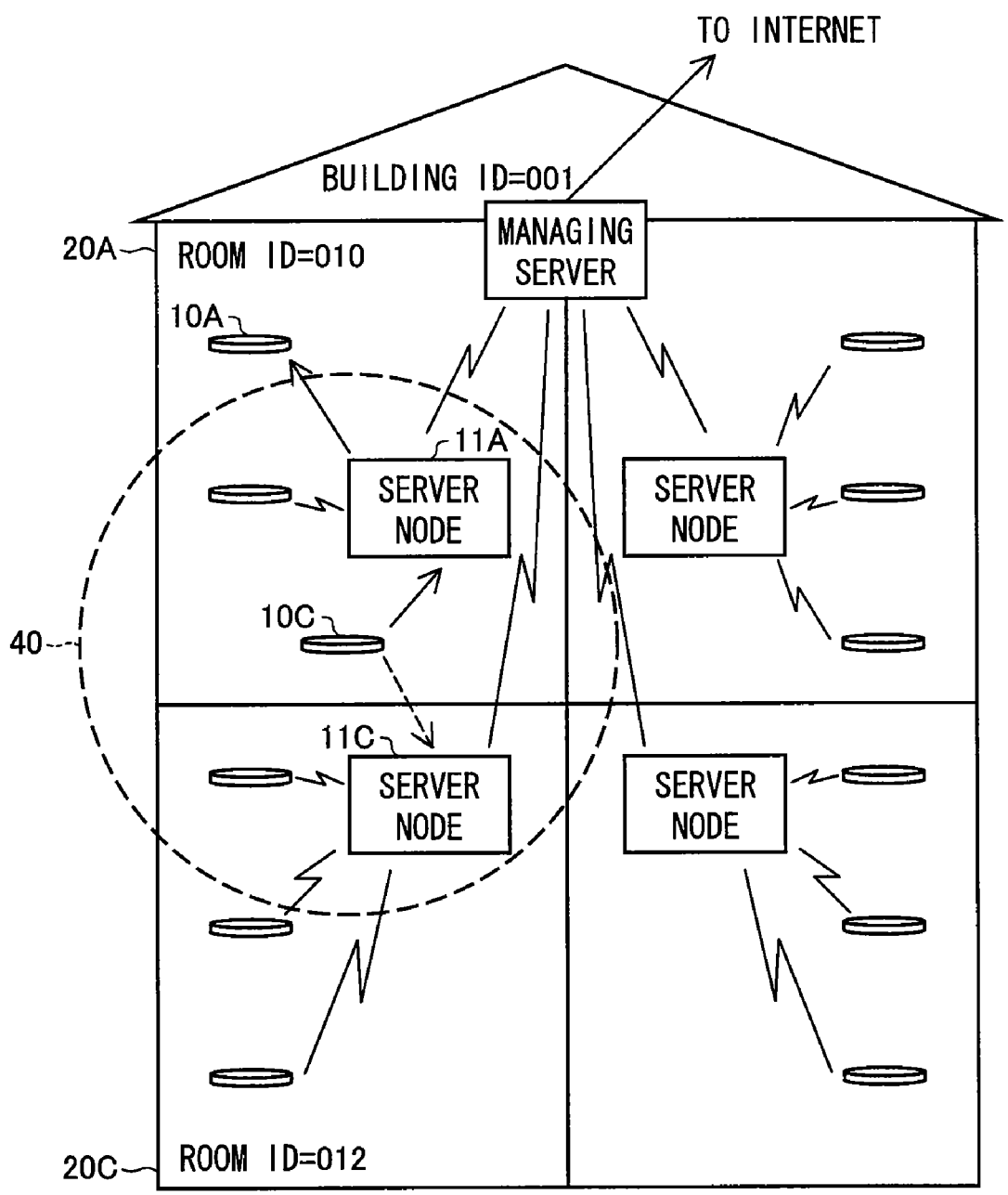
FIG. 5 is a diagram illustrating one example of communication paths, according to the reference example of the present invention.
Figure 6:
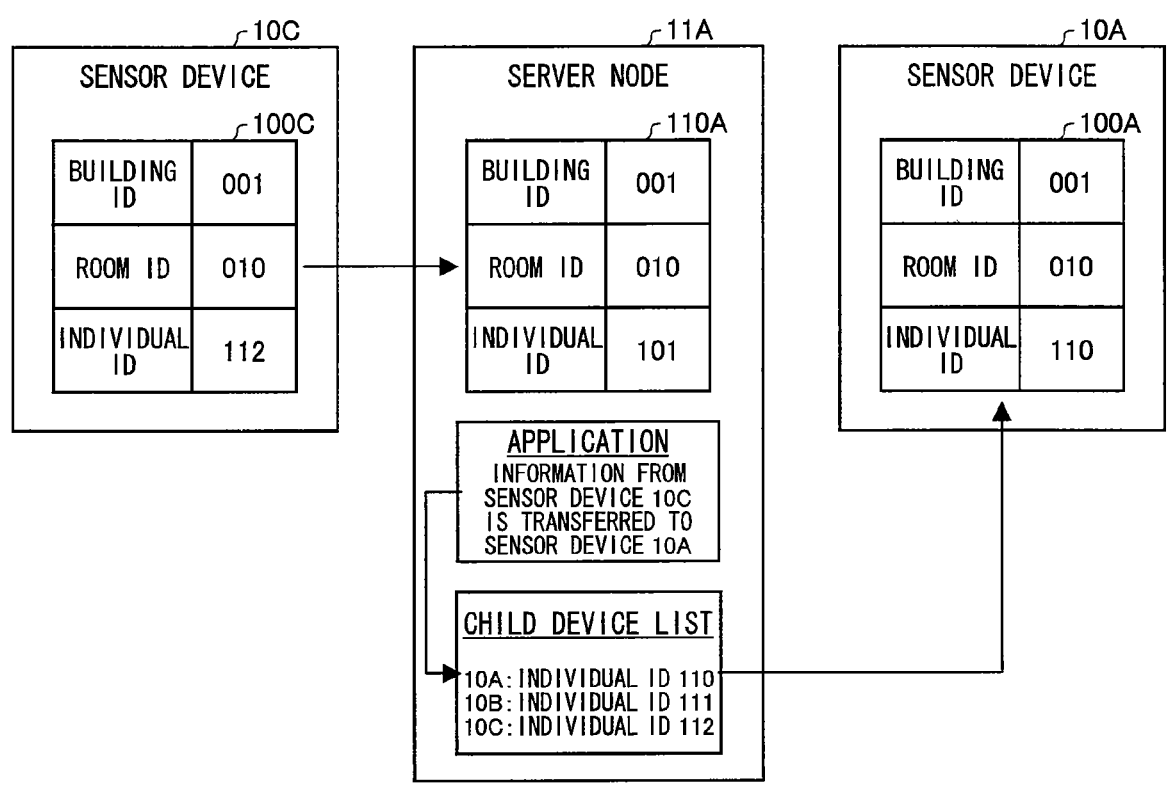
FIG. 6 is a diagram illustrating how to decide a path at a time when communication takes place, according to the reference example of the present invention.

In this reference example, explained below is an example of data transfer through a communication path that has been already established. FIGS. 5 and 6 illustrate a procedure in which data detected by the sensor device 10C is transferred to the sensor device 10A in the same room.

The sensor device 10C can send data to the server nodes 11A and 11C in a communicable area 40 of the sensor device 10C.

In a case where a communication path is newly established, each of the sensor devices 10A through 10L gradually reduces a transmission power until the server node that each of the sensor devices 10A through 10L can communicate with becomes one. With the reduced transmission power at the time where the only one server node remains communicable, the each of the sensor devices 10A through 10L communicates with the server node that remains to the end. In terms of the reduced transmission power, typically, the server node in a communicable range is only one. The above case is explained in details later.

In the explanation, this example assumes that the server nodes that the sensor device 10C can communicate with by the reduced transmission power are server nodes 11A and 11C. Such a situation occurs, for example, in the following case. Namely, in a case where, because a shield that attenuated electric waves existed between the sensor device 10C and the server node 11C at establishment of a communication path, the sensor device 10C previously had, as a parent, the server node 11A that remained as a result of reducing the transmission power. However, afterward, the shield is removed and the server nodes that the sensor device 10C can communicate with by the reduced transmission power are increased to the two server nodes 11A and 11C.

(Procedure 1) First, the sensor device 10C, as illustrated in FIG. 6, sends data packets including the building ID=001, the room ID=010, and the individual ID=112 stored in the table 100C.

(Procedure 2) The data packets sent from the sensor device 10C is received by the server nodes 11A and 11C.

(Procedure 3a) Here, the server node 11A has a child device list in the internal memory and recognizes from this list that the individual ID=112 is the sensor device 10C under the management of the server node 11A. Moreover, the server node 11A recognizes that the room ID=010 is identical with the room ID stored in the server node 11A. As a result, the server node 11A recognizes that the data packets received are addressed to the server node 11A.

(Procedure 3b) Although the server node 11C receives the data packets from the sensor device 10C, the individual ID in the data is not in a child device list which the server node 11C is managing, and the room ID=010 in the data packets received is different from the room ID=012 stored in the server node 11C. As a result, the server node 11C recognizes that the data packets received is not addressed to the server node 11C. Consequently, the server node 11C destroys the data packets received.

(Procedure 4) Next, in the server node 11A, the application program is executed to transfer the data packets having been received in accordance with the application rule.

In this example, the application rule is such that "the data packets received form the sensor device 10C is transferred to the sensor device 10A". According to this application rule, the data packets are transferred from the server node 11A after an individual ID of an address is changed to the individual ID of the sensor device 10A to which the data packets are to be transmitted.

(Procedure 5) As illustrated in the child device list of the server node 11A in FIG. 6, the data packets transmitted from the server node 11A are received by the sensor devices 10A through 10C. The sensor device 10A recognizes that the data packets are addressed to the sensor device 10A because the individual ID of the address is identical with the individual ID of the sensor device 10A. Meanwhile, the sensor devices 10B and 10C destroy the data packets because the individual ID of the address of the data packets does not agree with those of the sensor devices 10B and 10C.

According to the above procedure, the data is transmitted from the sensor device 10C to the sensor device 10A.

<Example of Data Transfer (II)>

Next, a second example of data transfer through a communication path that has been established is explained.

Figure 7:
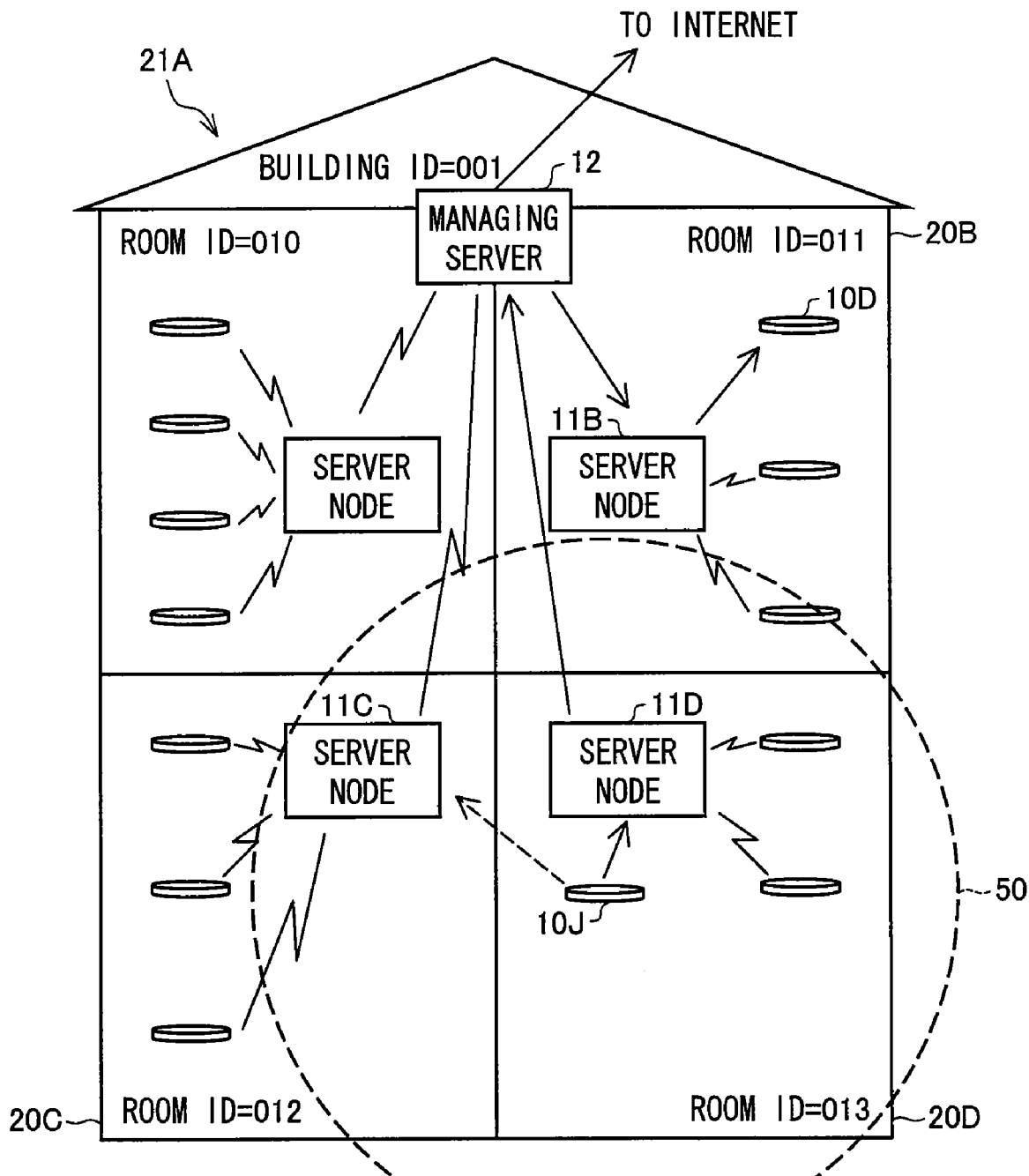
FIG. 7 is a diagram illustrating one example of communication paths, according to the reference example of the present invention.
Figure 8:
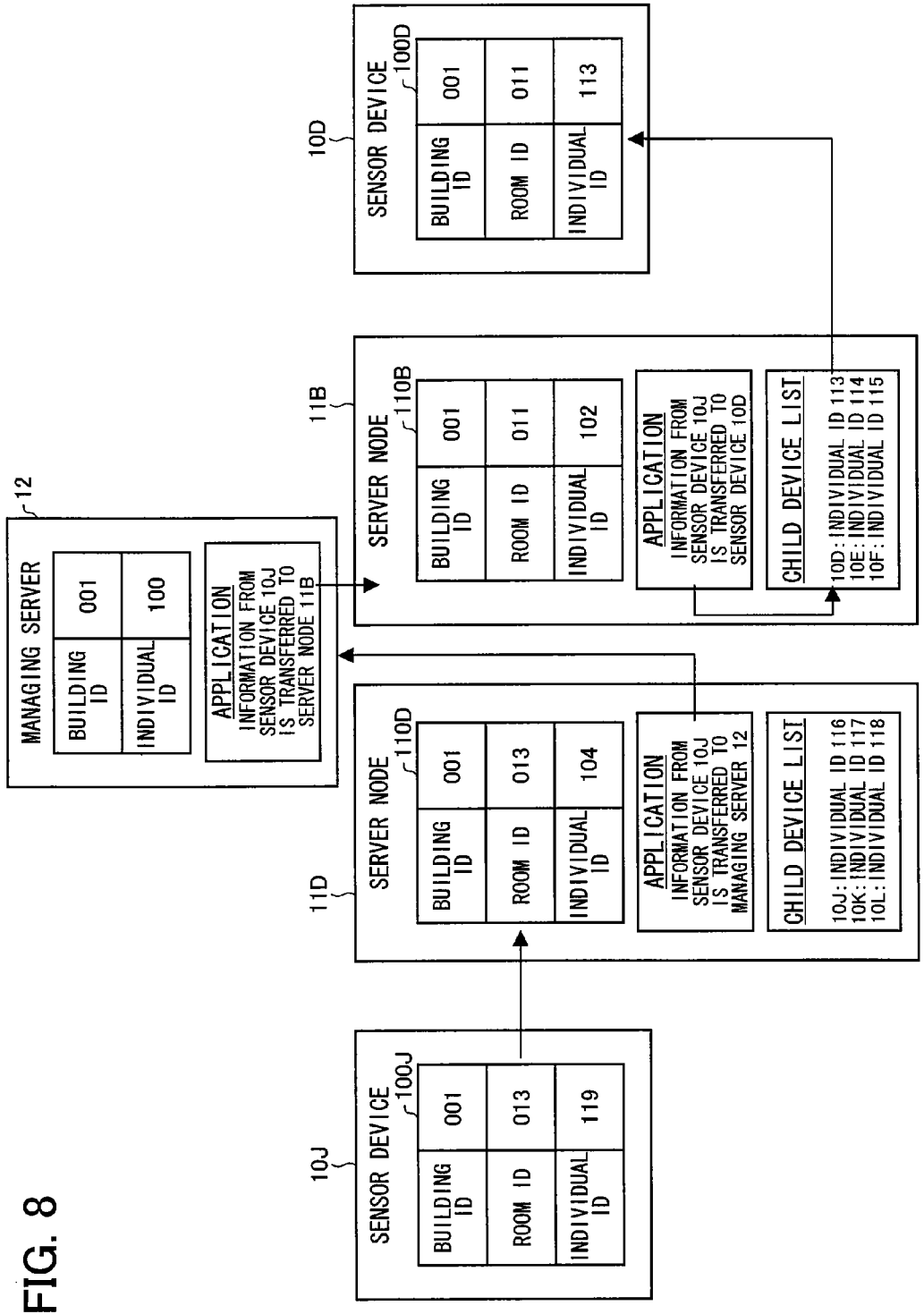
FIG. 8 is a diagram illustrating how to decide a path at a time when communication takes place, according to the reference example of the present invention.

FIGS. 7 and 8 illustrate an example in which data detected by the sensor device 10J is transferred to the sensor device 10D in a different room.

In this example, as in the example of the data transfer explained above, different from a typical case, the sensor device 10J is assumed to be capable of performing data transfer to the server nodes 11C and 11D in the communicable area 50 of the sensor device 10J.

(Procedure 1) As illustrated in FIG. 8, first, the sensor device 10J sends data packets including the building ID=001, the room ID=013, and the individual ID=119 that are stored in the table 100J.

(Procedure 2) The data packets sent from the sensor device 10J is received by the server nodes 11C and 11D.

(Procedure 3) Here, the server node 11D, as in the example of the data transfer as explained above, recognizes that the data packets received is addressed to the server node 11D. The server node 11C, as in the example of the data transfer as explained above, destroys the data packets received.

(Procedure 4) Next, in the server node 11D, the application program is executed to transfer the data packets received in accordance with an application rule.

In this example, the application rule is such that "the data packets received from the sensor device 10J are transferred to the managing server 12A".

(Procedure 5) Next, in the managing server 12A, the application program is executed to transfer the data packets received, in accordance with an application rule.

In this example, the application rule is such that "the data packets sent form the sensor device 10J are transferred to the server node 11B".

(Procedure 6) Next, in the server node 11B, the application program is executed to transfer the data packets received in accordance with an application rule.

In this example, the application rule is such that "the data packets sent from the sensor device 10J are transferred to the sensor device 10D".

(Procedure 7) The sensor device 10D recognizes that the data packets are addressed to the sensor device 10D because the individual ID of the address is identical with the individual ID of the sensor device 10D.

According to the procedure explained above, the data is sent from the sensor device 10J to the sensor device 10D.

<Procedure of Establishing Communication Path>

Figure 9:
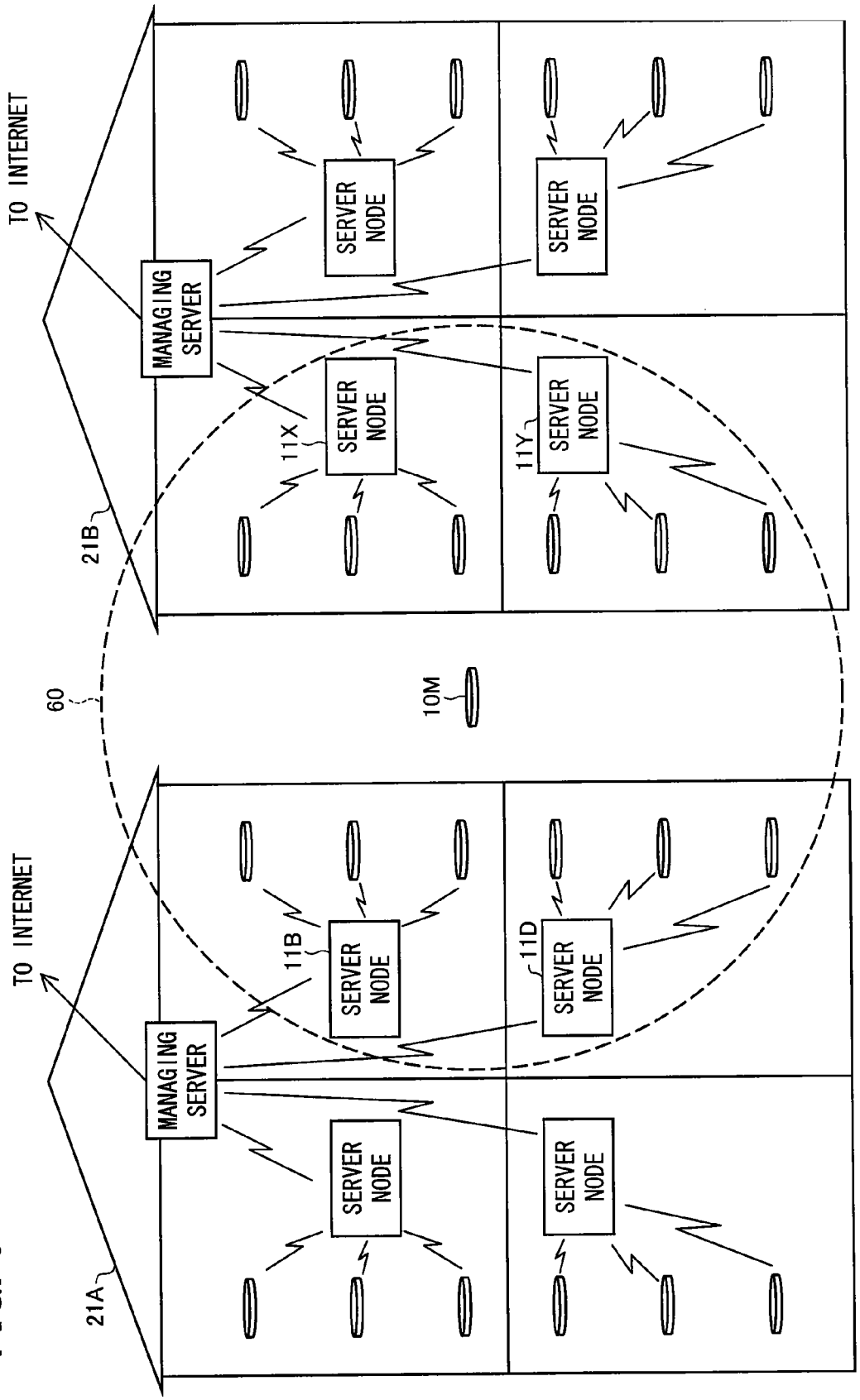
FIG. 9 is a diagram illustrating a communicable area of a sensor device in a case where the sensor device is newly added to the sensor network, according to the reference example of the present invention.
Figure 11:
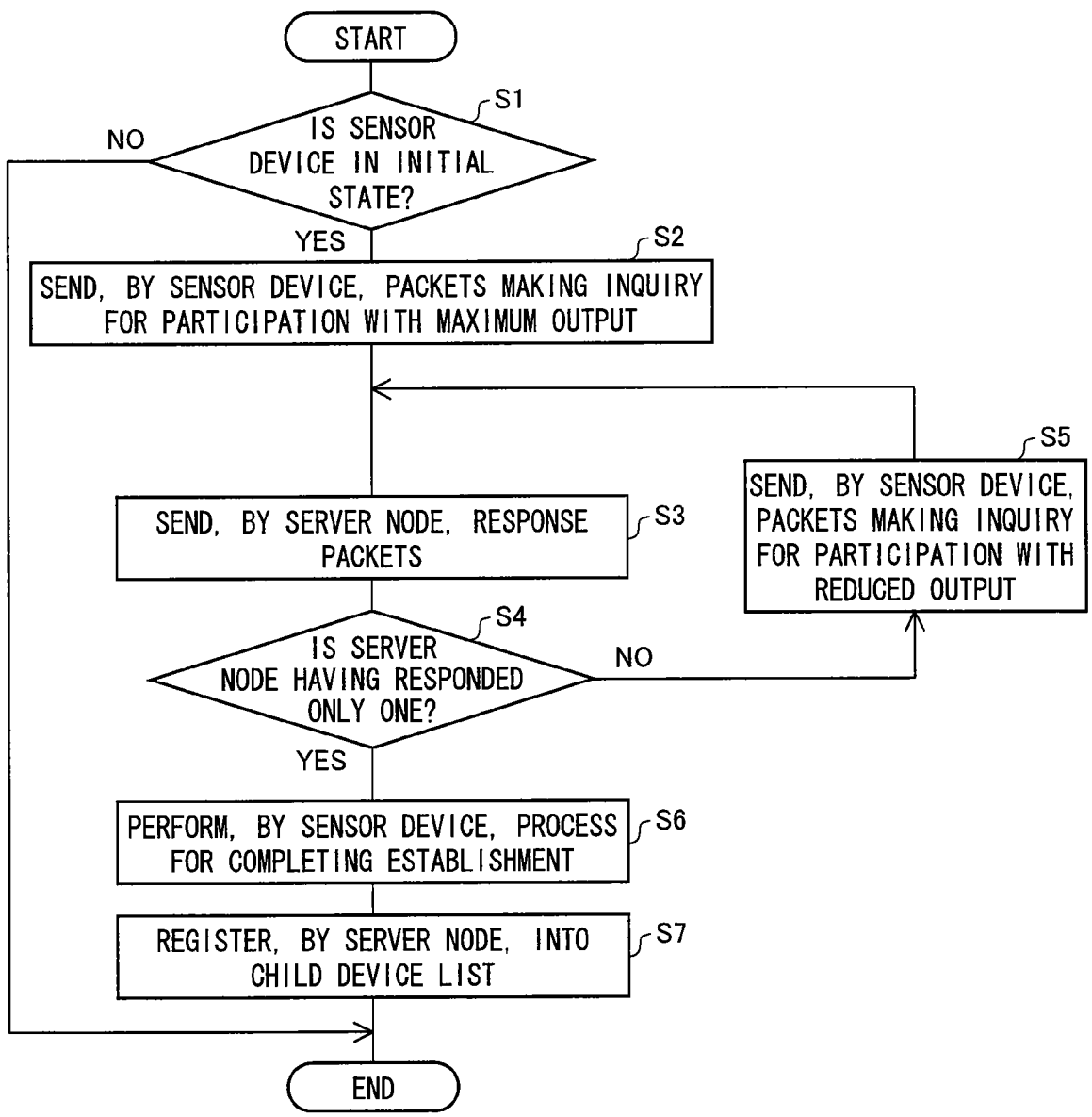
FIG. 11 is a flow chart illustrating a procedure for establishing a communication path, according to the reference example of the present invention.

With reference to FIGS. 9 and 11, explained below is a method of establishing a new communication path in a case where a sensor device is newly added to the sensor network system.

FIG. 9 illustrates a communicable area 60 in a case where a sensor device 10M is newly set. The communicable area 60 includes four server nodes 11B, 11D, 11X, and 11Y. Accordingly, the sensor device 10M can perform data communication with these four server nodes. The server nodes 11B and 11D are in the building 21A and the server nodes 11X and 11Y are in a building 21B.

In the present invention, a server node is selected from the four server nodes in accordance with a concept such that power consumption efficiency on data communication becomes the most efficient when the sensor device has, as a parent, a server node with which the sensor device 10M can communication with a minimum transmission power.

Figure 10:
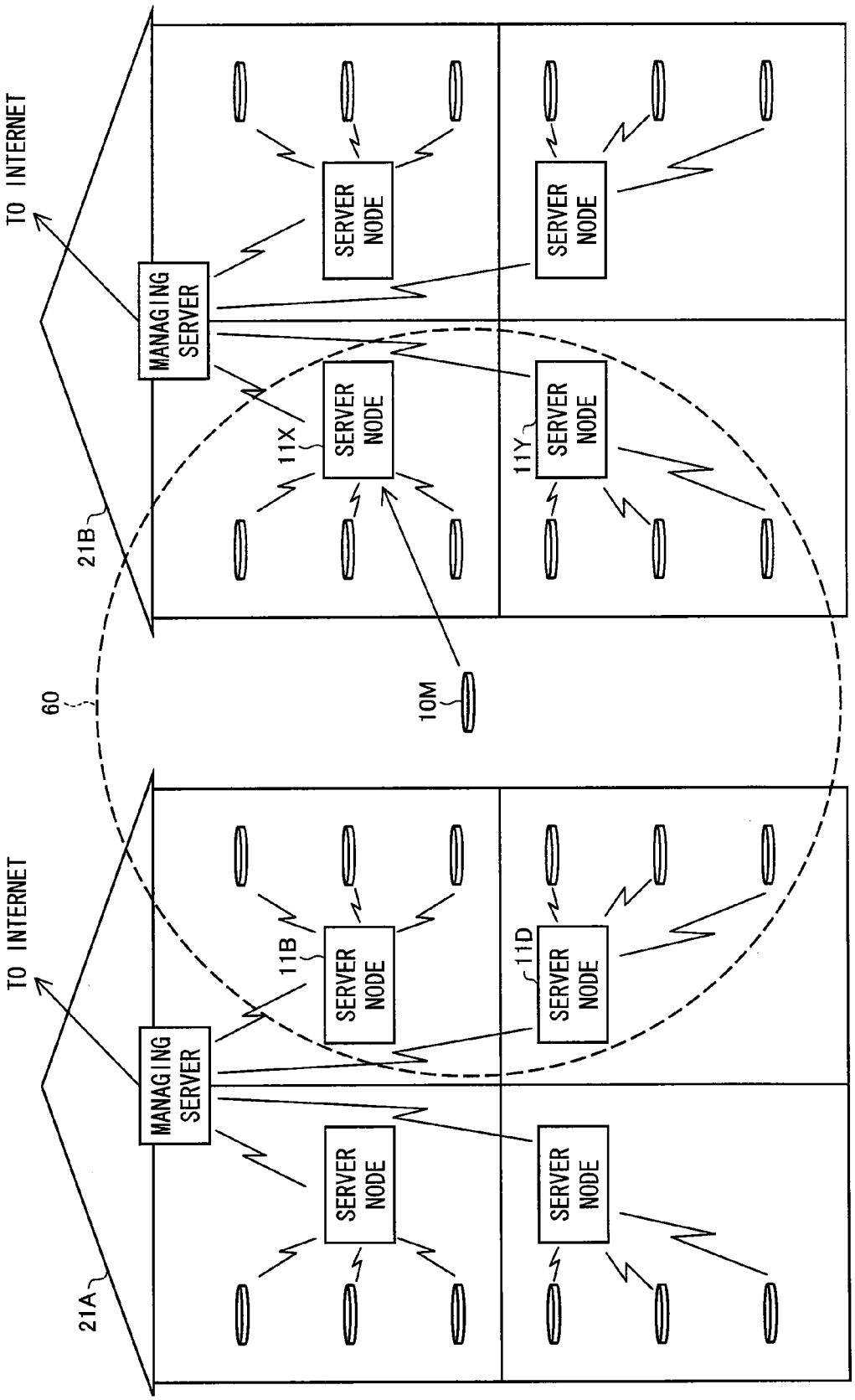
FIG. 10 is a diagram illustrating communication paths in a case where a sensor device is newly added to the sensor network, according to the reference example of the present invention.

This reference example assumes that, when the sensor device 10M carries out communication, communication with the server node 11X in the building 21B requires a minimum transmission power among the communications with the four server nodes. On such an assumption, the sensor device 10M starts to establish a communication path to the server node 11X in the building 21B, as illustrated in FIG. 10.

FIG. 11 is a flow chart illustrating a procedure at the time when the sensor device 10M establishes a communication path.

(Procedure 1) First, the control section 3 of the sensor device 10M determines whether or not the sensor device 10M is in an initial state (Step 1, hereinafter, referred to as S1). This determination is carried out by determining whether or not a building ID and a room ID are stored in a table 100M in an internal memory of the sensor device 10M.

When the sensor device 10M is in an initial state, the sensor device 10M proceeds to the next procedure.

When the sensor device 10M is not in an initial state, the processing is ended because a communication path has been already established. In this case, the sensor device 10M has, as a parent, a server node set in a room having a room ID stored in the table 100M, i.e., a server node storing, in the table of the internal memory, the room ID in the table 100M.

(Procedure 2) When the sensor device 10M is determined to be in an initial state, the control section 3 of the sensor device 10M sends, with a maximum output, packets making an inquiry for participation in the sensor network (S2).

(Procedure 3) The server node that has received the packets making the inquiry for participation sends response packets notifying that the server node can become a parent of the sensor device 10M and let the sensor device 10M join in the sensor network (S3).

Because the initial packets making the inquiry for participation is sent with the maximum power of the sensor device 10M, as illustrated in FIG. 9, four server nodes 11B, 11D, 11X, and 11Y receive the packets. Accordingly, each of these four server nodes sends response packets.

(Procedure 4) The sensor device 10M that has received the response packets determines whether the number of the server node having sent the response packets is one or not.

When the number of the server node is one, the sensor device 10M proceeds to the process at S6.

When the number of the server nodes is not one, the sensor device 10M proceeds to the process at S5.

(Procedure 5) After reducing the transmission power by a predetermined amount, the control section 3 of the sensor device 10M sends the packets making the inquiry for participation in the sensor network again (S5). Then, the sensor device 10M returns to the process at S3.

(Procedure 6) When the number of the server node having sent response packets is one, the control section 3 of the sensor device 10M carries out a process completing the establishment (S6).

In this example, the server node 11X is a server node that remains to the end. The process completing the establishment includes: (i) a process to set a current transmission power as a transmission power for communication with the server node 11X in the future; (ii) a process to store the building ID and the room ID included in the response packets from the server node 11X as the building ID and the room ID of the sensor device 10M in the table 100M of the internal memory; and (iii) a process to send, to the server node 11X, notification packets notifying that the sensor device 10M will have the server node 11X as the parent of the sensor device 10M.

(Procedure 7) The control section 6 of the server node having received the notification packets registers, in the child device list in the internal memory of the server node 11X, the name of the sensor device having sent the notification packets and the individual ID of the sensor device (S7).

In accordance with the procedure explained above, the sensor device 10M becomes a child device of the server node 11X and completes the establishment of a communication path.

Embodiment 1

In the present embodiment, sensor devices and server nodes include security level information and perform communication path establishment in accordance with the information.

<Arrangement of Sensor Network System>

In the present embodiment, arrangements of sensor devices, server nodes, and a managing server are the same as those in the reference example except the following point, and the detailed explanations thereof are omitted.

Figure 12:
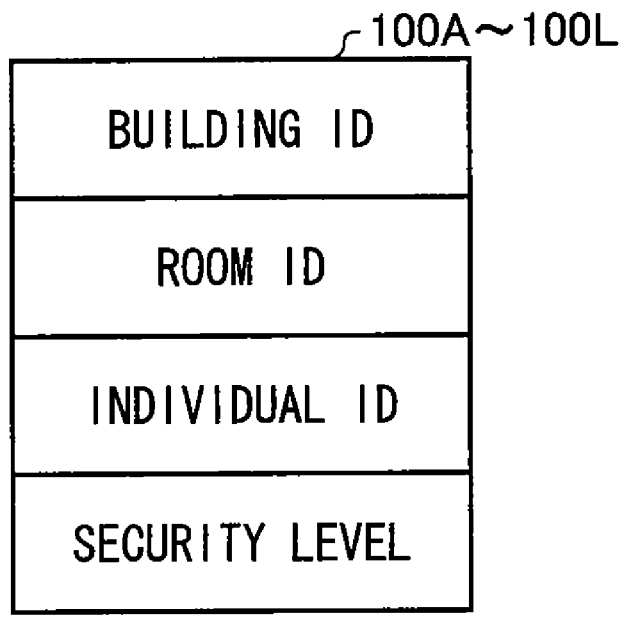
FIGS. 12(a) and 12(b) are tables of internal memories in which building IDs, room IDs, individual IDs, and security levels are stored, according to the first embodiment of the present invention.
Figure 12:
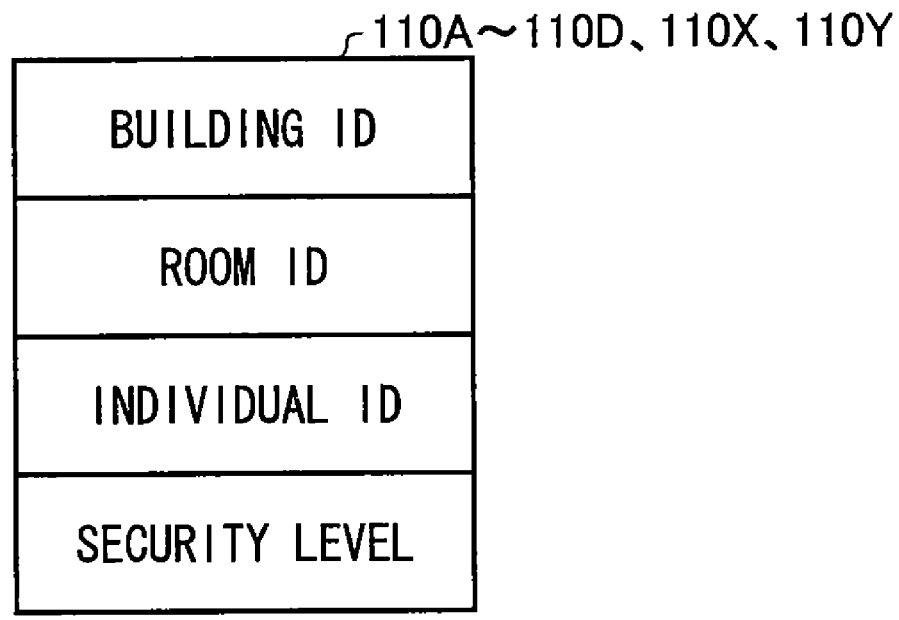

A different point in an arrangement of the present embodiment from an arrangement in the reference example is such that, as illustrated in FIG. 12(a), in each of tables 100A through 100L in internal memories of respective control sections 3 of sensor devices 10A through 10L, security level information is stored in addition to a building ID, a room ID, and an individual ID.

As illustrated in FIG. 12(b), security level information is also stored in each of tables 110A through 110D, 110X, and 110Y respectively corresponding to server nodes 11A through 11D, 11X, and 11Y.

<Security Level Information>

In the present embodiment, the sensor devices 10A through 10L and the server nodes 11A through 11D, 11X, and 11Y include security level information. This security level information is used to control an operation at the time when a sensor device joins in a sensor network. The security level has two values "high" and "low".

<Procedure of Establishing Communication Path>

The following explains a procedure in which a newly set sensor device 10M establishes a communication path in order to join in the sensor network. As in the reference example, as illustrated in FIG. 9, a communicable area in which the sensor device 10M can perform communication with a maximum power includes four server nodes 11B, 11D, 11X, and 11Y.

Figure 13:
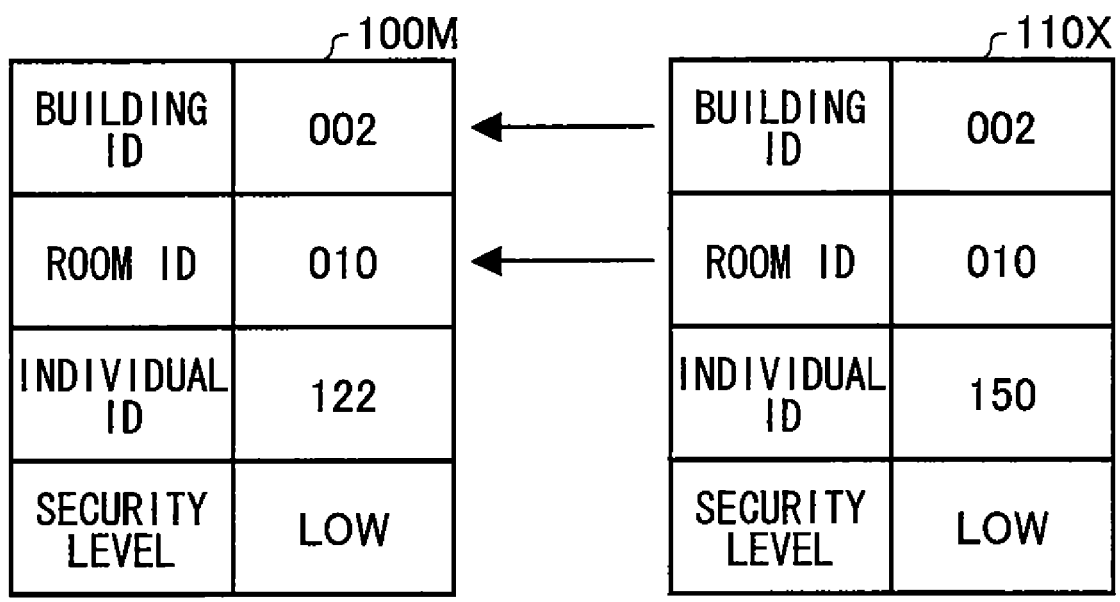
FIG. 13 is a diagram illustrating a situation in which the building ID and the room ID of the server node are set as the building ID and the room ID of the sensor device, according to the first embodiment of the present invention.

In an initial state, when the security level of the sensor device 10M is "low", the procedure of establishing a communication path become the same as the procedure explained in the reference example, and the explanation thereof is omitted. In this case, the sensor device 10M establishes a communication path with the server node 11X. At the establishment of the communication path, as illustrated in FIG. 13, the building ID=002 and the room ID=010 stored in the table 110X in the internal memory in a control section 6 of the server node 11X are stored in the table 100M in the internal memory in the control section 3 of the sensor device 10M as the building ID and the room ID of the sensor device 10M.

Next explained is a case where security level of the sensor device 10M is "high" in the initial state.

A case where the security level of the sensor device 10 is set to "high" is, for example, a case where a manager is planning to set the sensor device 10M so that the sensor device 10M is connected to the sensor network system of the building 21A.

In this case, before the sensor device 10M is set, the security level of the sensor device 10M is set to "high". Different from a case in which the security level is "low", the server node 11X does not become a parent of the sensor device 10M.

Figure 1:
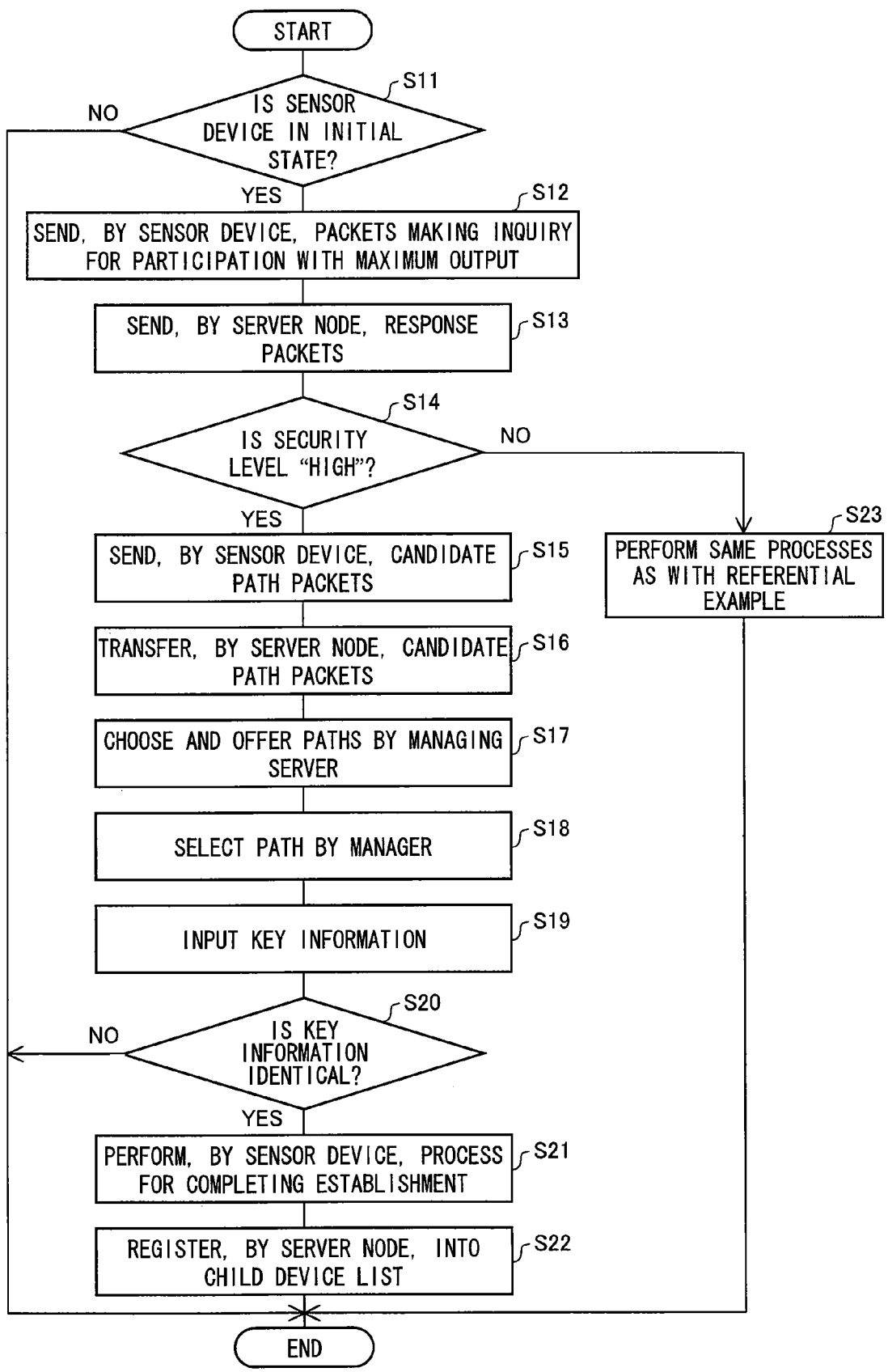
FIG. 1 is a flow chart illustrating a procedure for establishing a communication path, according to the first embodiment of the present invention.

FIG. 1 is a flow chart illustrating a procedure in which the sensor device 10M establishes a communication path.

(Procedure 1) First, the control section 3 of the sensor device 10M determines whether or not the sensor device 10M is in an initial state (S11). This determination is carried out by determining whether or not a building ID and a room ID are stored in the table 100M in the internal memory of the sensor device 10M.

When the sensor device 10M is in an initial state, the sensor device 10M proceeds to the next procedure.

When the sensor device 10M is not in an initial state, the processing is ended because a communication path has been already established.

(Procedure 2) When the sensor device 10M is determined to be in an initial state at S11, the control section 3 of the sensor device 10M sends, with a maximum output, packets making an inquiry for participation in the sensor network (S12).

(Procedure 3) The server node that has received the packets making the inquiry for participation sends response packets notifying that the server node can become a parent of the sensor device 10M and let the sensor device 10M join in the sensor network (S13).

Because the initial packets making the inquiry for participation is sent with the maximum power of the sensor device 10M, as illustrated in FIG. 9, four server nodes 11B, 11D, 11X, and 11Y receive the packets. Accordingly, each of these four server nodes sends response packets.

(Procedure 4) The control section of the sensor device 10M determines whether or not the security level is set to "high" (S14).

When the security level is "high", the sensor device 10M proceeds to the process at S15.

When the security level is not "high", the sensor device 10M performs communication path establishment with the same procedure (S23) as in the reference example and ends processing.

(Procedure 5) When the security level is "high", the control section 3 of the sensor device 10M sends candidate path packets including information on the server nodes from which the response packets are received (S15).

(Procedure 6) The server nodes having received the candidate path packets transfer the candidate path packets to the higher-level managing server (S16).

(Procedure 7) The managing server having received the candidate path packets chooses only paths having the same building ID as the managing server from candidate paths in the candidate path packets and offers the selected candidate paths to a manager (S17).

Figure 14:
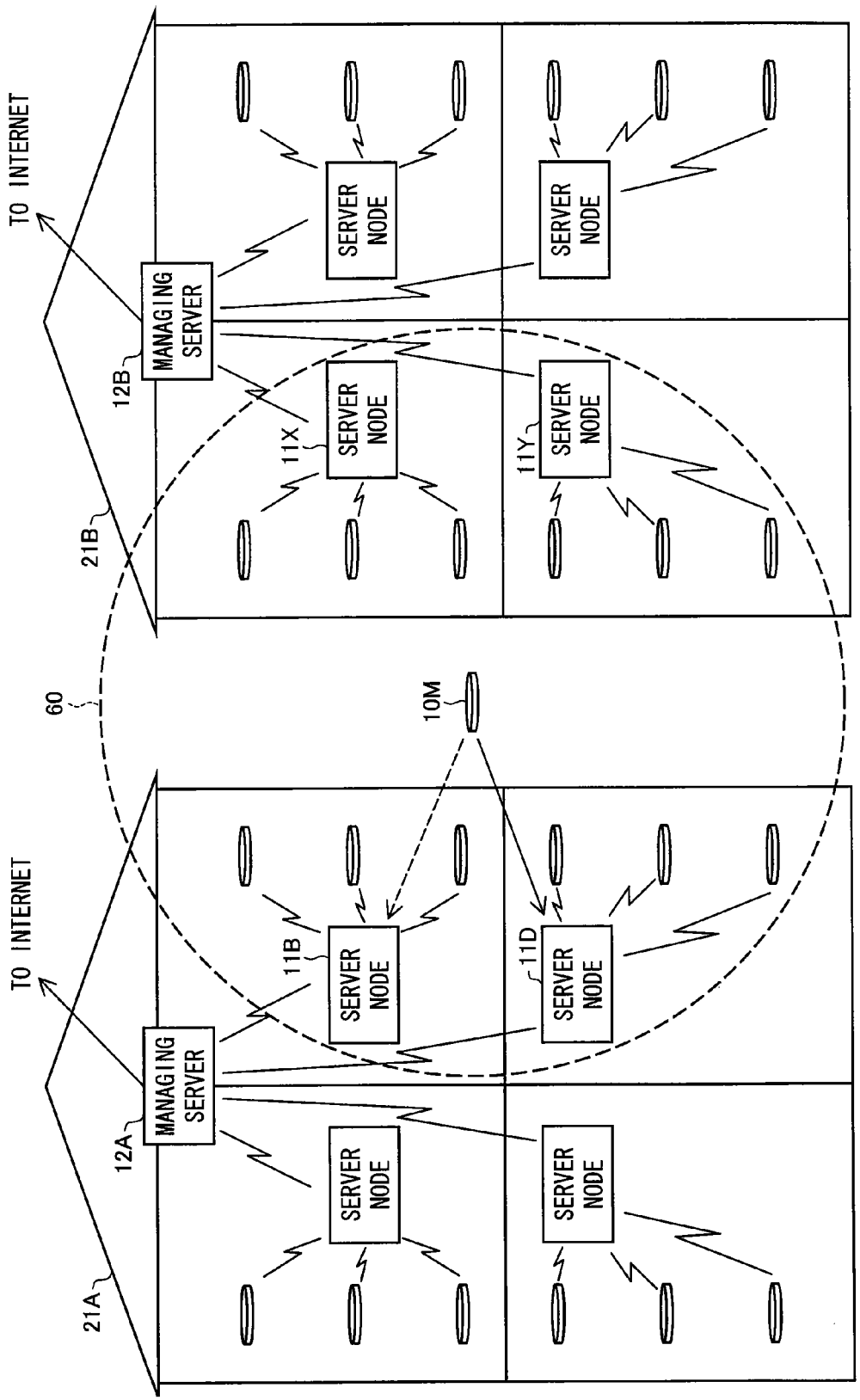
FIG. 14 is a diagram illustrating one example of communication paths, according to the first embodiment of the present invention.

For example, in an example as illustrated in FIG. 14, as candidate paths, the candidate path packets includes: a path from the sensor device 10M to the managing server 12A via the server node 11B; a path from the sensor device 10M to the managing server 12A via the server node 11D; a path from the sensor device 10M to the managing server 12B via the server node 11X; and a path from the sensor device 10M to the managing server 12B via the server node 11Y.

The managing server 12A offers, to the manager, paths that have the same building ID as the managing server 12A which paths include the path from the sensor device 10M to the managing server 12A via the server node 11B and the path from the sensor device 10M to the managing server 12A via the server node 11D.

Meanwhile, the managing server 12B offers, to the manager, paths that have the same building ID as the managing server 12B which paths include the path from the sensor device 10M to the managing server 12B via the server node 11X and the path from the sensor device 10M to the managing server 12B via the server node 11Y. However, the manager of the managing server 12B does not know key information explained later. Accordingly, the manager cannot join the sensor device 10M in the sensor network as a sensor device under the management of the managing server 12B.

(Procedure 8) The manager selects a desired path from the candidate paths offered by the managing server (S18). In this example, the manager is assumed to have selected a path from the sensor device 10M to the managing server 12A via the server node 11D.

(Procedure 9) The manager inputs key information in the managing server (S19). The key information inputted is notified to the sensor device 10M through the path selected at S18 as key information packets. The key information may be the individual ID of the sensor device 10M as long as the information is obtained by only the manager. The server node 11D selected by the manager adds the building ID and the room ID of the server node 11D the key information packets and notifies the building ID and the room ID to the sensor device 10M.

(Procedure 10) The control section 3 of the sensor device 10M determines whether or not the key information included in key information packets received is identical with key information that the sensor device 10M has (S20).

When the sensor information is identical, the sensor device 10M proceeds to the process at S21.

When the sensor information is not identical, the sensor device 10M ends processing of establishing a communication path.

Figure 15:
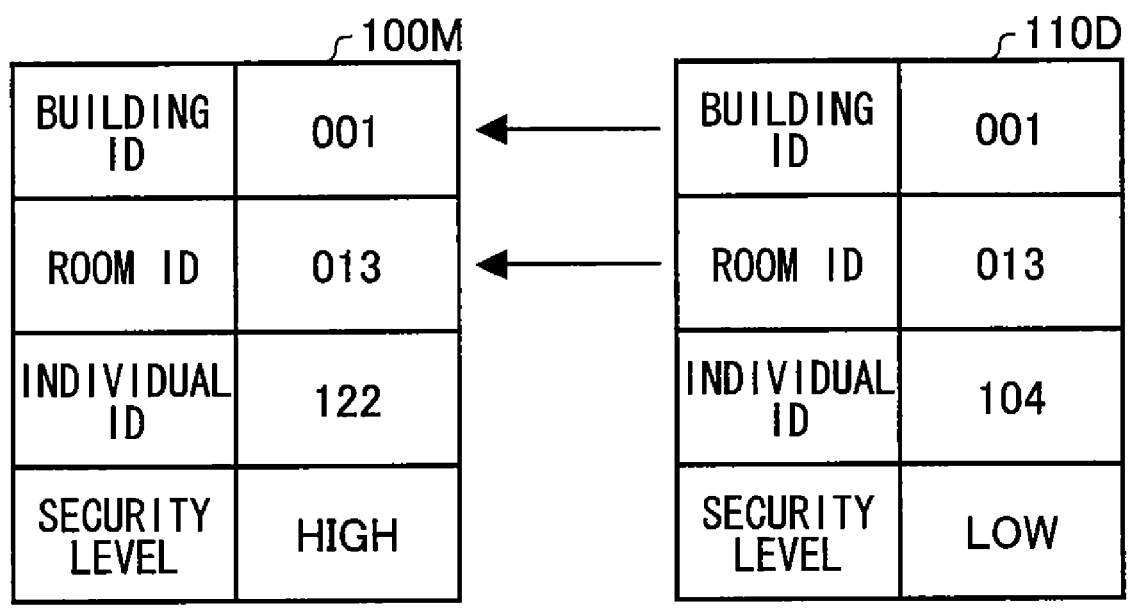
FIG. 15 is a diagram illustrating a situation in which the building ID and the room ID of the server node are set as the building ID and the room ID of the sensor device, according to the first embodiment of the present invention.

(Procedure 11) When the key information included in the key information packets received is identical with the key information of the sensor device 10M, as illustrated in FIG. 15, the control section 3 of the sensor device 10M stores the building ID and the room ID included in the key information packets received in the table 100M as the building ID and the room ID of the sensor device 10M. Then, The control section 3 sends establishment completing packets to the server node 11D (S21).

(Procedure 12) The control section 6 of the server node 11D receives the establishment completing packets. Then, the control section 6 registers the name of the sensor device and the individual ID of the sensor device 10M in a child device list in an internal memory and also notifies the completion of the establishment to the managing server 12A (S22).

According to the procedure as mentioned above, when the security level is set to "high", the establishment of the communication path is completed in accordance with the communication path desired by the manager.

After the establishment of the communication path is completed between the sensor device 10M and the server node 11D, the sensor device 10M may carry out a process to adjust the transmission power by reducing the transmission power to a minimum transmission power that still allows the communication with the server node 11D.

Embodiment 2

In the present embodiment, only points different from the Embodiment 1 are explained. In an arrangement of the present embodiment, the processes at S12 and S13 of the flow chart as illustrated in FIG. 1 are different from those of the Embodiment 1. In an arrangement of the Embodiment 1, a sensor device 10M sends packets making an inquiry for participation one time with a maximum output, and a server node that can correspond responds to the packets only once. On the other hand, in the present embodiment, the sensor device 10M sends packets making an inquiry for the participation a plurality of times by reducing the transmission output stepwise, after first sending packets making the inquiry for the participation with the maximum output.

<Procedure of Establishing Communication Path>

In an initial state, a security level of the sensor device 10M is set to "high".

FIG. 16 is a flow chart illustrating a procedure in which the sensor device 10M establishes a communication path.

Procedures 1 through 3 are the same as those of the Embodiment 1, and the explanations thereof are omitted.

(Procedure 3A) Next, the sensor device 10M determines whether or not response packets are received in response to packets making an inquiry for participation, namely, whether or not any server node has responded to the packets making an inquiry for participation (S24).

In a case where the response packets are received, the sensor device proceeds to the process at S25.

In a case where the response packets are not received, the sensor device 10M proceeds to a process of a next procedure 4.

(Procedure 3B) The sensor device 10M stores information concerning a current transmission power and each server node that sends response packets in response to the inquiry for the participation with the current transmission power (S25).

(Procedure 3C) Next, the sensor device 10M sends packets making the inquiry for the participation in the sensor network again, after having reduced the current transmission power level by a predetermined amount (S5).

The operations from Procedures 3A to 3C are repeated until no server node sends response packets to the inquiry from the sensor device 10M for participation in the sensor network.

The sensor device 10M again carries out the inquiry for the participation with a transmission power that is one level larger than the transmission power with which there has become no response received. A managing server recognizes that the inquiry for the participation has been completed by an arrival of the packets making the inquiry for the participation at the same transmission power level.

Procedure 4 is the same as that of the Embodiment 1, and the explanation thereof is omitted.

(Procedure 5) When the security level is "high", the control section 3 of the sensor device 10M sends candidate path packets including information of (i) the each server node from which the response packets are received; and (ii) a minimum transmission power level that is necessary to communicate with the each server node that has sent the response packets (S15).

Procedure 6 is the same as that of the embodiment 1, and the explanation thereof is omitted.

(Procedure 7) Having received the candidate path packets, the managing server selects only paths that have the same building ID as the managing server from the candidate paths included in the candidate path packets. Then, the managing server offers the selected paths and the minimum transmission power level required in the communication with the server nodes in the selected paths (S17).

Namely, a managing server 12A offers, to the manager, (i) a path from the sensor device 10M to the managing server 12A via a server node 11B and (ii) a path from the sensor device 10M to the managing server 12A via a server node 11D, and (iii) a minimum transmission power level required for the transmission from the sensor device 10M to the server nodes 11B and 11D that have the same building ID as the managing server.

(Procedure 8) The manager selects a desired path from the candidate paths offered at the managing server in consideration of the necessary minimum transmission power level (S18). In this example, the manager is assumed to select a path from the sensor device 10M to the managing server 12A via the server node 11D.

Procedures 9 through 12 are the same as those of the Embodiment 1 and the explanation thereof is omitted.

(Procedure 13) The sensor device 10M sets, as a transmission power to be used in communication with the server node selected, the minimum transmission power necessary for communication with the server node selected.

According to the procedure explained above, when the security level is set to "high", the establishment of the communication path is completed. This communication path is desired by the manager and realizes communication with the necessary minimum transmission power.

<Supplementary Explanation>

The present invention should not be narrowly interpreted within the limits of such embodiments and concrete examples, but rather may be applied in many variations within the spirit of the present invention, provided such variations do not exceed the scope of the patent claims set forth below. Moreover, a combination of the technical means explained in different embodiments above is also included in the technical scope of the present invention.

Each block of the sensor devices 10A through 10L, the server nodes 10A through 11D, and the managing server 12A, particularly the control sections 3, 6, and 9 may be realized by hardware logic or software with a CPU as follows.

Namely, each of the sensor devices 10A through 10L, the server nodes 11A through 11D, and the managing server 12A includes a CPU (Central Processing Unit) that executes an order of a control program for realizing the aforesaid functions, ROM (Read Only Memory) that stores the control program, RAM (Random Access Memory) that expands the control program, a storage device (storage medium), such as memory, that stores the control program and various kinds of data therein. The object of the present invention can also be achieved by a storage medium. The storage medium stores, in computer-readable manner, program codes (executable code program, intermediate code program, and source program) of the control program of each of the sensor devices 10A through 10L, the server nodes 11A through 11D, and the managing server 12A, which storage medium is software for realizing the aforesaid functions. The storage medium is provided to the sensor devices 10A through 10L, the server nodes 11A through 11D, and the managing server 12A. With this arrangement, the sensor devices 10A through 10L, the server nodes 11A through 11D, and the managing server 12A as a computer (alternatively, CPU or MPU) reads out and executes program code stored in the storage medium provided.

Examples of the storage medium mentioned above include a tape, such as a magnetic tape and a cassette tape; a disc including a magnetic disk, such as a Floppy Disk (Registered Trademark) and a hard disk, and an optical disk, such as a CD-ROM, MO, MD, DVD, and CD-R; a card, such as an IC card (inclusive of a memory card) and an optical card; and a semiconductor memory, such as a mask ROM, an EPROM (Erasable Programmable Read Only Memory), an EEPROM (Electrically Erasable Programmable Read Only Memory), and a flash ROM.

Moreover, the sensor devices 10A through 10L, the server nodes 11A through 11D, and the managing server 12A may be arranged so as to be connectable to a communication network so that the program code is supplied to the sensor devices 10A through 10L, the server nodes 11A through 11D, and the managing server 12A via the communication network. This communication network is not specifically limited. Examples of the communication network include the Internet, intranet, extranet, LAN (Local Area Network), ISDN (Integrated Services Digital Network), VAN (Value Added Network), CATV (Cable TV) communication network, virtual private network, telephone line network, mobile communication network, and satellite communication network. Further, a transmission medium that constitutes the communication network is also not specifically limited. Example of the transmission medium include (i) wired lines such as IEEE (Institute of Electrical and Electronics) 1394, USB (Universal Serial Bus), power-line carrier, cable TV lines, telephone lines, and ADSL (Asymmetric Digital Subscriber Line) lines; and (ii) wireless connections, such as IrDA (Infrared Data Association) and remote control using infrared light, Bluetooth (Registered Trademark), 802.11, HDR (High Data Rate), mobile telephone network, satellite connections, and terrestrial digital network. The present invention can also be realized by the program codes in the form of a computer data signal embedded in a carrier wave which is embodied by electronic transmission.

As mentioned above, the sensor device of the present invention includes: control means for controlling (a) establishment of a communication path to the server node and (b) communication with the server node, the control means, at the establishment of the communication path to the managing server, performing: (I) detection of the server node that is connectable; (II) transmission of information on the communication path including the server node detected as one of candidate communication paths to a managing server that is in a higher level of the server node; (III) reception of information from the server node in the communication path selected, the information including: key information, inputted into the managing server, for determination of the communication path; the communication path selected from the candidate communication paths at the managing server; the building ID of the server node in the communication path selected; and the room ID of the server node in the communication path selected; (IV) notification of (a) the individual ID of the sensor device and (b) agreement between the key information and sensor device key information to the managing server; and (V) storage of the building ID and the room ID of the server node received as the building ID and the room ID of the sensor device, the (IV) notification and the (V) storage performed only in a case where the key information agrees with the sensor device key information, the control means thus completing the establishment of the communication path.

As mentioned above, the server node of the present invention includes: control means for controlling (a) establishment of a communication path to the managing server and the sensor device and (b) communication with the managing server and the sensor device, the control means, at the establishment of the communication path to the sensor device, performing: (i) response to an inquiry from the sensor device for detection of the server node that is connectable; (ii) transfer of a candidate list of the communication path to the managing server, the candidate list including information, received from the sensor device, on the communication path; (iii) reception of information from the managing server, the information including the communication path selected and key information inputted in the managing server; (iv) transfer of the information to the sensor device, the information including the building ID and the room ID of the server node, as well as the communication path selected and the key information respectively received from the managing server; and (v) storage of the individual ID of the sensor device received from the sensor device as an individual ID of a sensor device that the server node manages, the (iii) reception, the (iv) transfer, and the (v) storage being performed in a case where the communication path selected from the candidate list at the managing server includes the server node, the control means thus completing the establishment of the communication path.

As mentioned above, the sensor network system of the present invention includes the sensor device and the server node.

As mentioned above, according to the present invention, the method of establishing a communication path includes the steps of: (i) making an inquiry, by the sensor device, for detection of the server node that is connectable; (ii) making a response, by the server node, to the inquiry; (iii) transmitting, by the sensor device, a result of the inquiry as a candidate list of the communication path; (iv) transferring, by the server node, the candidate list that the server node receives to a managing server that is a higher-level node of the server node; (v) receiving, by the managing server, selection information indicative of the communication path selected from the candidate list and key information and transmitting the selection information and the key information into the communication path selected; (vi) transferring, by the server node, the selection information and the key information that are received by the server node together with the building ID and the room ID of the server node; (vi) determining, by the sensor device, whether or not the key information agrees with sensor device key information; (vii) notifying, by the sensor device, to the server node agreement of the key information and the sensor device key information together with the individual ID of the sensor device; (viii) storing by the server node the individual ID received as an individual ID of a sensor device that the server node manages; and (ix) storing by the sensor device the building ID and the room ID of the server node as the building ID and the room ID of the sensor device, the building ID and the room ID of the server node being received by the sensor device, the method including the steps (vii), (viii), and (ix) only in a case where the key information is identical with the sensor device key information.

Accordingly, in the sensor network, a sensor device or a server node to be newly or additionally set can be prevented from being mistakenly connected to a network different from a network to which the sensor device or the server node should be connected, even in a case where the sensor device or the server node has, in its communicable area, another sensor network such as a sensor network of an adjacent house. This makes it possible to establish a communication path safely and reliably.

Consequently, it becomes possible to provide a method of establishing a data transfer path safely and reliably in a wireless network such as a home security system.

In addition to the arrangement as mentioned above, in the sensor device of the present invention, at the (I) detection of the server node that is connectable, the control means performs: (1) transmission of an inquiry for detection of the server node that is connectable; (2) until none of the server node responds to the inquiry, repetition of: record of information including (a) a transmission power level at the transmission of the inquiry and (b) a name of the server node having responded; reduction of the transmission power level at the transmission of the inquiry by a predetermined amount; and retry of the inquiry with a transmission power at a transmission power level reduced; and (3) transmission of information to the managing server which is in the higher-level of the server node, the information including, as a candidate option, a combination of (a) the name of the server node detected and (b) a minimum transmission power level required for communication with the server node.

In the arrangement, when the sensor device detects a server node connectable to the sensor device, the control means of the sensor device checks a transmission power of the sensor device which transmission power is necessary for communication with each server node. For example, first, the control means sends inquiry packets with a maximum transmission power level (100% of an transmission output). Here, it is assumed that four server nodes have responded. Then, the control section reduces the transmission power by a predetermined amount (for example, to 80% of the original transmission power) and transmits inquiry packets again. This time, three server nodes are assumed to have responded. From this, the sensor device recognizes that 100% of the transmission power is a minimum transmission power level necessary for communication with the server node that has not responded this time. Repeating this operation, the control means finds out a minimum transmission power level necessary to communicate with each server node. The control means transmits information obtained to a managing server that is in a higher level with respect to each server node via each server node having responded to the inquiry. The managing server offers the information received to a manager.

According to the arrangement, a list of server nodes that the sensor device can connect to is offered on the managing server together with information on the minimum transmission power levels necessary to communicate with the respective server nodes. Therefore, the manager can safely and reliably establish a communication path that requires a low transmission power, namely, low power consumption.

The sensor device and the server node of the present invention may include information called a security level as well as a mechanism to specify the communication path as mentioned above. The security level information is used for switching between a method of establishing a communicating path autonomously by the sensor device and the server node and a method of establishing a communication path according to a communication path selected by the manager. It is preferable that the security level information is inside each of the sensor device and the server node and stored in an involatile memory.

When the security level of the sensor device is set to "low", the sensor device of the present invention determines that the communication path may be freely established. In this case, the sensor device establishes the communication path autonomously, considering convenience as important. Namely, after detecting server nodes in the communicable area and reducing the transmission power step by step, the sensor device may connect to the server node so that the communication with the server node requires a minimum transmission power.

As with the sensor device, when the security level of the server node is set to "low", the server node of the present invention determines the communication path may be freely established. In this case, the server node establishes the communication path autonomously, considering convenience as important. Namely, after detecting managing servers in the communicable area and reducing the transmission power step by step, the sensor device may connect to the managing server so that the communication with the managing server requires a minimum transmission power.

On the other hand, when the security level of the server node is set to "high", the server node of the present invention determines that a communication through a particular communication path is necessary. In such a case, although the server node detects communication paths that can be autonomously established so as to keep convenience, the establishment of the communication path is not completed autonomously. In this case, the server node transmits as options for the communication path to be established, to the managing server in the communicable area, information on the communication paths detected. The managing server offers the options for the communication path to the manager. Then, the manager selects a desired communication path from the options for the communication path. On selecting the desired communication path and completing the establishment of the communication path, the manager inputs, for authorization of the manager, key information having been registered in the server node in advance. In a case where this key information is not correctly inputted, the authorization of the manager fails. Consequently, in such a case, the establishment of the communication path is not completed in accordance with the communication path selected by the manager.

The options of the communication path are also provided on a managing server in a neighboring house in the communicable area of the server node. However, the manager of the neighboring house cannot know the key information. Therefore, a wrong communication path is never established.

The sensor network system of the present invention includes the sensor devices, the server nodes, and the managing server. In each of the sensor devices, the server nodes, and the managing server, a building ID, a room ID and an individual ID are stored. This makes it possible to safely establish a communication path without interference by specifying each ID even in a case where different networks exist in a communicable area of a wireless device.

A method of establishing a communication path in a sensor network system of the present invention is a method that ensures (i) simple operation such that the communication path is selected from candidate communication paths autonomously chosen and (ii) safety by input of key information stored in the sensor device or the server node to be connected, in specifying a building ID, a room ID, and an individual ID.

As a result, when a sensor device or a server node is added, it becomes possible to provide operationally and safety that does not hamper autonomy as well as prevents in advance a wrong autonomous connection to a different network in a communicable area, for example, in a neighboring house.

A sensor device of the present invention being managed based on a building ID specifying a building, a room ID specifying a room in the building, and an individual ID specifying each device and carrying out (a) wireless communication with a server node that is a higher-level server node by using the building ID and the room ID stored in the sensor device and (b) communication with a managing server that is a top-level node managing the server node via the server node, the sensor device may include: control means for controlling (a) establishment of a communication path to the server node and (b) communication with the server node, the control means, at the establishment of the communication path to the server node, performing: (I) transmission of an inquiry for detection of the server node that is connectable; (II) repetition of reducing, by a predetermined amount, a transmission power for transmission of the inquiry and transmission of the inquiry, until the server node that responds to the inquiry becomes one; (III) notification, to the one remaining server node, of a determination that the server node will become a higher-level server of the sensor device and the individual ID of the sensor device; (IV) reception of the building ID and the room ID of the server node; and (V) storage of the building ID and the room ID of the server node received as the building ID and the room ID of the sensor device, the control means thus completing the establishment of the communication path.

A server node of the present invention being managed based on a building ID specifying a building, a room ID specifying a room in the building, and an individual ID specifying each device, and carrying out (a) wireless communication with a managing server that is a higher-level node of the server node by using the building ID and the room ID stored in the server node and (b) wireless communication with a sensor device that is a lower-level node by using the individual ID stored in the server node, the server node may include: control means for controlling (a) establishment of a communication path to the managing server and the sensor device and (b) communication with the managing server and the sensor device, the control means, at the establishment of the communication path to the sensor device, performing: (i) response to an inquiry from the sensor device for detection of the server node that is connectable; (ii) transmission, to the sensor device, of the building ID and the room ID of the server node in response to the notification including a determination that the server node will become a higher-level server of the sensor device and the individual ID of the sensor device; and (iii) storage of the individual ID of the sensor device received from the sensor device as an individual ID of a sensor device that the server node manages, the control means thus completing the establishment of the communication path.

A server node of the present invention being managed based on a building ID specifying a building, a room ID specifying a room in the building, and an individual ID specifying each device, and carrying out (a) wireless communication with a managing server that is a higher-level node of the server node by using the building ID and the room ID stored in the server node and (b) wireless communication with a sensor device that is a lower-level node by using the individual ID stored in the server node, the server node may include: control means for controlling (a) establishment of a communication path to the managing server and the sensor device and (b) communication with the managing server and the sensor device, the control means, at the establishment of the communication path to the managing server, performing: (I) transmission of an inquiry for detection of the managing server that is connectable; (II) repetition of reducing, by a predetermined amount, a transmission power for transmission of the inquiry and transmission of the inquiry, until the managing server that responds to the inquiry becomes one; (III) notification, to the one remaining managing server, of a determination that the managing server will become a higher-level server of the sensor device and the individual ID of the server node; (IV) reception of the building ID of the managing server; and (V) storage of the building ID of the managing serve received as the building ID of the server node, the control means thus completing the establishment of the communication path.

According to the present invention, a method of establishing a communication path through which a sensor device and a server node that is a higher-level node of the sensor device carry out wireless communication by using a building ID and a room ID stored in the sensor device or an individual ID stored in the server node, the sensor device and the server node being managed based on the building ID, the room ID, and the individual ID, the building ID specifying a building, the room ID specifying a room in the building, the individual ID specifying each device, the method may include the steps of: (i) making an inquiry, by the sensor device, for detection of the server node that is connectable; (ii) making a response, by the server node, to the inquiry; (iii) selecting the server node by returning to the step (i) after reducing a transmission power by a predetermined amount, until the server node that responds to the inquiry becomes one; (iv) determining the server node by the sensor device by notifying, to the server node remaining to the end in the step (iii), a determination that the server node will be a higher level server of the sensor device and the individual ID of the sensor device; (v) transmitting, from the server node, the building ID and the room ID of the server node to the sensor device in response to the notification; (vi) writing by the sensor device the building ID and the room ID received into the internal memory region of the sensor device; and (vii) writing by the server node the individual ID received from the sensor device into the internal memory region of the server node.

According to a method of establishing a data transfer path in a sensor network system of the present invention, the sensor network system includes one or plurality of sensor devices each having a wireless communication function and being provided in or around a building, one or plurality of server nodes each carrying out wireless communication with the one or plurality of sensor devices, and a managing server carrying out wireless communication with the one or plurality of server nodes. Each of the managing server, the one or plurality of the server nodes, and the one or plurality of sensor devices has a room ID capable of dividing an inside and peripheries of a building and an individual ID specifying each individual device other than a building ID. In this method, the data transfer path connecting each of the managing server, the one or plurality of server nodes, and the one or plurality of sensor devices may be established by specifying the building ID, the room ID, and the individual ID.

According to the method of establishing a data transfer path in a sensor network system of the present invention, the building ID has a sufficient number of digits for identifying each of all existing buildings. According to the method, each of the managing server, the server nodes, and the sensor devices existing inside or around the same building may be able to specify the data transfer path by sharing the same building ID.

According to the method of establishing a data transfer path in a sensor network system of the present invention, the room ID has a sufficient number of digits for dividing and identifying inside or peripheries of a building. According to the method, each of the server nodes and the sensor devices existing in the same division may be able to specify the data transfer path by sharing the same room ID.

According to the method of establishing a data transfer path in a sensor network system of the present invention, the data transfer path may be able to be specified by providing the individual ID with a sufficient number of digits for allowing each of all the existing managing server, server nodes, and the sensor devices to be identified.

According to the method of establishing a data transfer path in a sensor network system of the present invention, the sensor device may include security level information and be able to change a completion level of the data transfer path autonomously established according to the level.

According to the method of establishing a data transfer path in a sensor network system of the present invention, when the security level stored in the sensor device is low, the sensor device may perform: (i) connection to the server node that allows communication with a minimum transmission power as well as autonomous detection of a communicable server node; and (ii) writing a building ID and a room ID of the server node into an internal storage region of the sensor device, the sensor device thus completing the establishment of the data transfer path.

According to the method of establishing a data transfer path in a sensor network system of the present invention, when the security level stored in the sensor device is high, the sensor device may perform: choosing of one or plurality of candidate data transfer paths by autonomously detecting a server node that is communicable; selection of a path from the one or plurality of candidate paths at a terminal connected to the managing server; and writing the building ID and the room ID of the server node selected into an inside region of the sensor device only in a case where correct key information is inputted for determination of the path, the sensor device thus completing the establishment of the data transfer path.

According to the method of establishing a data transfer path in a sensor network system of the present invention, the server node may include security level information and decide completion level of the data transfer path to be autonomously established according to the level.

According to the method of establishing a data transfer path in a sensor network system of the present invention, when the security level stored in the server node is low, the server node may perform: (i) connection to the managing server that allows communication with a minimum transmission power as well as autonomous detection of a communicable managing server; and (ii) writing a building ID and a room ID of the managing server into an internal storage region of the server node, the server node thus completing the establishment of the data transfer path.

According to the method of establishing a data transfer path in a sensor network system of the present invention, when the security level stored in the server node is high, the server node may perform: choosing of one or plurality of candidate data transfer paths by autonomously detecting a managing server that is communicable; selection of a path from the one or plurality of candidate paths at a terminal connected to the managing server; and writing the building ID and the room ID of the managing server selected into an inside region of the server node only in a case where correct key information is inputted for determination of the path, the server node thus completing the establishment of the data transfer path.

The sensor network system of the present invention may be a sensor network system adopting the method of establishing the data transfer path.

In the sensor network system of the present invention, the sensor device may attempt to reduce power consumption by adjusting a transmission output to the minimum level that allows communication with the server node after completing the establishment of the data transfer path.

In the sensor network system of the present invention, the server node may attempt to reduce power consumption by adjusting a transmission output to the minimum level that allows communication with the sensor device after completing the establishment of the data transfer path.

The sensor network of the present invention can prevent a sensor device or a server node to be newly or additionally set from being mistakenly connected to a network different from a network to which the sensor device or the server node should be connected even in a case where other sensor network, for example, a sensor network of a neighboring house exists in a communicable area of the sensor device or the server node to be newly or additionally set. Accordingly, a communication path can be established safely and reliably. Accordingly, the sensor network of the present invention is preferably used in the sensor network system in every field, for example, crime-prevention, nursing care, energy conservation, wide area measurement, or tracing.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A sensor device comprising:
a control section controlling (a) establishment of a communication path to a server node and (b) communication with the server node,
the control section being configured to, at the establishment of the communication path to the server node, perform:
(I) detection of the server node that is connectable;
(II) transmission of information on the communication path including the server node detected as one of candidate communication paths to a managing server that is in a higher level of the server node;
(III) reception of information from the server node in the communication path selected, the information including:
key information, inputted into the managing server, for determination of the communication path;
the communication path selected from the candidate communication paths at the managing server;
a building ID of the server node in the communication path selected; and
a room ID of the server node in the communication path selected;
(IV) notification of (a) the individual ID of the sensor device and (b) agreement between the key information and sensor device key information to the managing server; and
(V) storage of the building ID of the server node and the room ID of the server node received as a building ID of the sensor device and a room ID of the sensor device,
the (IV) notification and the (V) storage being performed only in a case where the key information agrees with the sensor device key information,
the control section thus completing the establishment of the communication path,
the sensor device being managed based on the building ID, the room ID, and the individual ID, and carrying out (a) wireless communication with the server node by using the building ID and the room ID stored in the sensor device and (b) communication with the managing server via the server node,
the building ID specifying a building,
the room ID specifying a room in the building,
the individual ID specifying each device,
the server node being a higher-level node,
the managing server being a top-level node managing the server node.

2. The sensor device as set forth in claim 1, wherein:
at the (I) detection of the server node that is connectable, the control section is further configured to perform:
(1) transmission of an inquiry for detection of the server node that is connectable;
(2) until none of the server node responds to the inquiry, repetition of:
record of information including (a) a transmission power level at the transmission of the inquiry and (b) a name of the server node having responded;
reduction of the transmission power level at the transmission of the inquiry by a predetermined amount; and
retry of the inquiry with a transmission power at a transmission power level reduced; and
(3) transmission of information to the managing server which is in the higher level of the server node, the information including, as a candidate option, a combination of (a) the name of the server node detected and (b) a minimum transmission power level required for communication with the server node.

3. A server node comprising:
a control section controlling (a) establishment of a communication path to a managing server and a sensor device and (b) communication with the managing server and the sensor device,
the control section being configured to, at the establishment of the communication path to the sensor device, perform:
(i) response to an inquiry from the sensor device for detection of the server node that is connectable;
(ii) transfer of a candidate list of the communication path to the managing server, the candidate list including information, received from the sensor device, on the communication path;
(iii) reception of information from the managing server, the information including the communication path selected and key information inputted in the managing server;
(iv) transfer of the information to the sensor device, the information including a building ID of the server node and a room ID of the server node as well as, the communication path selected and the key information respectively received from the managing server; and
(v) storage of an individual ID of the sensor device received from the sensor device as an individual ID of a sensor device that the server node manages,
the (iii) reception, the (iv) transfer, and the (v) storage being performed in a case where the communication path selected from the candidate list at the managing server includes the server node,
the control section thus completing the establishment of the communication path,
the server node being managed based on the building ID, the room ID, and the individual ID, and carrying out (a) wireless communication with the managing server by using the building ID and the room ID stored in the server node and (b) wireless communication with the sensor device by using the individual ID stored in the server node,
the building ID specifying a building,
the room ID specifying a room in the building,
the individual ID specifying each device,
the managing server being a higher-level node,
the sensor device being a lower-level node.

4. A sensor network system comprising:
a sensor device including:
a control section controlling (a) establishment of a communication path to a server node and (b) communication with the server node,
the control section being configured to, at the establishment of the communication path to the server node, perform:
(I) detection of the server node that is connectable;
(II) transmission of information on the communication path including the server node detected as one of candidate communication paths to a managing server that is in a higher level of the server node;
(III) reception of information from the server node in the communication path selected, the information including:
key information, inputted into the managing server, for determination of the communication path;

the communication path selected from the candidate communication paths at the managing server;
a building ID of the server node in the communication path selected; and
a room ID of the server node in the communication path selected;
(IV) notification of (a) the individual ID of said sensor device and (b) agreement between the key information and sensor device key information to the managing server; and
(V) storage of the building ID of the server node and the room ID of the server node received as a building ID of the control section and a room ID of said sensor device,
the (IV) notification and the (V) storage being performed only in a case where the key information agrees with the sensor device key information,
the control section thus completing the establishment of the communication path,
said sensor device being managed based on the building ID, the room ID, and the individual ID, and carrying out (a) wireless communication with the server node by using the building ID and the room ID stored in said sensor device and (b) communication with the managing server via the server node,
the building ID specifying a building,
the room ID specifying a room in the building,
the individual ID specifying each device,
the server node being a higher-level node,
the managing server being a top-level node managing the server node; and
a server node including:
another control section controlling (a) establishment of a communication path to the managing server and said sensor device and (b) communication with the managing server and said sensor device,
the another control section being configured to, at the establishment of the communication path to said sensor device, perform:
(i) response to an inquiry from said sensor device for detection of the server node that is connectable;
(ii) transfer of a candidate list of the communication path to the managing server, the candidate list including information, received from said sensor device, on the communication path;
(iii) reception of information from the managing server, the information including the communication path selected and the key information inputted in the managing server;
(iv) transfer of the information to said sensor device, the information including the building ID of the server node and the room ID of the server node, as well as the communication path selected and the key information respectively received from the managing server; and
(v) storage of the individual ID of said sensor device received from said sensor device as an individual ID of a sensor device that said server node manages,
the (iii) reception, the (iv) transfer, and the (v) storage being performed in a case where the communication path selected from the candidate list at the managing server includes the server node,
the another control section thus completing the establishment of the communication path,
the server node being managed based on the building ID, the room ID, and the individual ID, and carrying out (a) wireless communication with the managing server by using the building ID and the room ID stored in the server node and (b) wireless communication with said sensor device by using the individual ID stored in the server node,
the managing server being a higher-level node of the server node,
said sensor device being a lower-level node.

5. The sensor network system as set forth in claim 4, wherein:
at the (I) detection of the server node that is connectable, the control section is further configured to perform:
(1) transmission of an inquiry for detection of the server node that is connectable;
(2) until none of the server node responds to the inquiry, repetition of:
record of information including (a) a transmission power level at the transmission of the inquiry and (b) a name of the server node having responded;
reduction of the transmission power level at the transmission of the inquiry by a predetermined amount; and
retry of the inquiry with a transmission power at a transmission power level reduced; and
(3) transmission of information to the managing server which is in the higher level of the server node, the information including, as a candidate option, a combination of (a) the name of the server node detected and (b) a minimum transmission power level required for communication with the server node.

6. A method of establishing a communication path through which a sensor device and a server node that is a higher-level node of the sensor device carry out wireless communication by using a building ID and a room ID stored in the sensor device or an individual ID stored in the server node, the sensor device and the server node being managed based on the building ID, the room ID, and the individual ID, the building ID specifying a building, the room ID specifying a room in the building, the individual ID specifying each device, the method comprising the steps of:
(i) making an inquiry, by the sensor device, for detection of the server node that is connectable;
(ii) making a response, by the server node, to the inquiry;
(iii) transmitting, by the sensor device, a result of the inquiry as a candidate list of the communication path;
(iv) transferring, by the server node, the candidate list that the server node receives to a managing server that is a higher-level node of the server node;
(v) receiving, by the managing server, selection information indicative of the communication path selected from the candidate list and key information, and transmitting the selection information and the key information to the communication path selected;
(vi) transferring, by the server node, the selection information and the key information that are received by the server node, together with the building ID and the room ID of the server node;
(vi) determining, by the sensor device, whether or not the key information agrees with sensor device key information;
(vii) notifying, by the sensor device, to the server node agreement of the key information and the sensor device key information together with the individual ID of the sensor device;
(viii) storing by the server node the individual ID received as an individual ID of a sensor device that the server node manages; and
(ix) storing by the sensor device the building ID and the room ID of the server node as the building ID and the room ID of the sensor device, the building ID and the room ID of the server node being received by the sensor device, the method including the steps (vii), (viii), and (ix) only in a case where the key information is identical with the sensor device key information.

7. A nontransitory computer readable storage medium storing a control program, execution of the program by a computer causing a control section of a sensor device to control (a) establishment of a communication path to a server node and (b) communication with the server node, such that the control section, at the establishment of the communication path to the server node performs:

(I) detection of the server node that is connectable;

(II) transmission of information on the communication path including the server node detected as one of candidate communication paths to a managing server that is in a higher level of the server node;

(III) reception of information from the server node in the communication path selected, the information including:

key information, inputted into the managing server, for determination of the communication path;

the communication path selected from the candidate communication paths at the managing server;

a building ID of the server node in the communication path selected; and a room ID of the server node in the communication path selected;

(IV) notification of (a) the individual ID of the sensor device and (b) agreement between the key information and sensor device key information to the managing server; and (V) storage of the building ID of the server node and the room ID of the server node received as a building ID of the sensor device and a room ID of the sensor device, the (IV) notification and the (V) storage being performed only in a case where the key information agrees with the sensor device key information, the control section thus completing the establishment of the communication path, the sensor device being managed based on the building ID, the room ID, and the individual ID, and carrying out (a) wireless communication with the server node by using the building ID and the room ID stored in the sensor device and (b) communication with the managing server via the server node, the building ID specifying a building, the room ID specifying a room in the building, the individual ID specifying each device, the server node being a higher-level node, the managing server being a top-level node managing the server node.

8. The computer readable storage medium as set forth in claim 7, wherein:

at the (I) detection of the server node that is connectable, the control section, further performs:

(1) transmission of an inquiry for detection of the server node that is connectable;

(2) until none of the server node responds to the inquiry, repetition of:

record of information including (a) a transmission power level at the transmission of the inquiry and (b) a name of the server node having responded;

reduction of the transmission power level at the transmission of the inquiry by a predetermined amount; and retry of the inquiry with a transmission power at a transmission power level reduced; and (3) transmission of information to the managing server which is in the higher level of the server node, the information including, as a candidate option, a combination of (a) the name of the server node detected and (b) a minimum transmission power level required for communication with the server node.

* * * * *